(12) United States Patent
Hall et al.

(10) Patent No.: US 7,064,676 B2
(45) Date of Patent: Jun. 20, 2006

(54) DOWNHOLE DATA TRANSMISSION SYSTEM

(75) Inventors: David R. Hall, Provo, UT (US); H. Tracy Hall, Jr., Provo, UT (US); David S Pixton, Lehi, UT (US); Scott Dahlgren, Provo, UT (US); Joe Fox, Spanish Fork, UT (US)

(73) Assignee: IntelliServ, Inc., Provo, UT (US)

( * ) Notice: Subject to any disclaimer, the term of this patent is extended or adjusted under 35 U.S.C. 154(b) by 480 days.

(21) Appl. No.: 10/604,812

(22) Filed: Aug. 19, 2003

(65) Prior Publication Data

US 2004/0104797 A1 Jun. 3, 2004

Related U.S. Application Data

(63) Continuation of application No. 09/816,766, filed on Mar. 23, 2001, now Pat. No. 6,670,880, which is a continuation-in-part of application No. 09/619,084, filed on Jul. 19, 2000, now abandoned.

(51) Int. Cl.
*G01V 3/00* (2006.01)

(52) U.S. Cl. .............................. 340/853.1; 340/854.1; 340/870.31; 166/242.6; 175/40

(58) Field of Classification Search .............. 340/854.1, 340/854.3, 854.4, 854.5, 870.3, 853.1, 870.31; 175/40, 45, 50; 166/66, 242.6
See application file for complete search history.

(56) References Cited

U.S. PATENT DOCUMENTS

| | | | |
|---|---|---|---|
| 749,633 A | 1/1904 | Seeley | |
| 2,178,931 A | 11/1939 | Crites et al. | |
| 2,197,392 A | 4/1940 | Hawthorn | |
| 2,249,769 A | 7/1941 | Leonardon | |
| 2,301,783 A | 11/1942 | Leo | |
| 2,354,887 A | 8/1944 | Silverman et al. | |
| 2,379,800 A | 7/1945 | Hare | |
| 2,414,719 A | 1/1947 | Cloud | |
| 2,531,120 A | 11/1950 | Feaster | |
| 2,633,414 A | 3/1953 | Boivinet | |
| 2,659,773 A | 11/1953 | Barney | |
| 2,662,123 A | 12/1953 | Koenig, Jr. | |
| 2,748,358 A | 5/1956 | Johnston | |
| 2,974,303 A | 3/1961 | Dixon | |
| 2,982,360 A | 5/1961 | Morton et al. | |
| 3,079,549 A | 2/1963 | Martin | |
| 3,090,031 A | 5/1963 | Lord | |
| 3,170,137 A | 2/1965 | Brandt | |
| 3,186,222 A | 6/1965 | Martin | |
| 3,194,886 A | 7/1965 | Mason | |
| 3,209,323 A | 9/1965 | Grossman, Jr. | |
| 3,227,973 A | 1/1966 | Gray | |
| 3,253,245 A | 5/1966 | Brandt | |

(Continued)

*Primary Examiner*—Anh Mai
(74) *Attorney, Agent, or Firm*—Jeffery E. Daly

(57) ABSTRACT

A system for transmitting data through a string of downhole components. In one aspect, the system includes first and second magnetically conductive, electrically insulating elements at both ends of the component. Each element includes a first U-shaped trough with a bottom, first and second sides and an opening between the two sides. Electrically conducting coils are located in each trough. An electrical conductor connects the coils in each component. In operation, a varying current applied to a first coil in one component generates a varying magnetic field in the first magnetically conductive, electrically insulating element, which varying magnetic field is conducted to and thereby produces a varying magnetic field in the second magnetically conductive, electrically insulating element of a connected component, which magnetic field thereby generates a varying electrical current in the second coil in the connected component.

32 Claims, 15 Drawing Sheets

U.S. PATENT DOCUMENTS

| | | |
|---|---|---|
| 3,518,608 A | 6/1970 | Papadopoulos |
| 3,696,332 A | 10/1972 | Dickson, Jr. et al. |
| 3,713,089 A | 1/1973 | Clacomb |
| 3,713,334 A | 1/1973 | Vann et al. |
| 3,793,632 A | 2/1974 | Still |
| 3,807,502 A | 4/1974 | Heilhecker et al. |
| 3,879,097 A | 4/1975 | Oertle |
| 3,930,220 A | 12/1975 | Shawhan |
| 3,957,118 A | 5/1976 | Barry et al. |
| 3,989,330 A | 11/1976 | Cullen et al. |
| 4,012,092 A | 3/1977 | Godbey |
| 4,087,781 A | 5/1978 | Grossi et al. |
| 4,095,865 A | 6/1978 | Denison et al. |
| 4,121,193 A | 10/1978 | Denison |
| 4,126,848 A | 11/1978 | Denison |
| 4,215,426 A | 7/1980 | Klatt |
| 4,220,381 A | 9/1980 | Van der Graaf |
| 4,348,672 A | 9/1982 | Givler |
| 4,445,734 A | 5/1984 | Cunningham |
| 4,496,203 A | 1/1985 | Meadows |
| 4,537,457 A | 8/1985 | Davis, Jr. et al. |
| 4,578,675 A | 3/1986 | MacLeod |
| 4,605,268 A | 8/1986 | Meador |
| 4,660,638 A | 4/1987 | Yates, Jr. |
| 4,660,910 A | 4/1987 | Sharp et al. |
| 4,661,932 A | 4/1987 | Howard et al. |
| 4,683,944 A | 8/1987 | Curlett |
| 4,698,631 A | 10/1987 | Kelly, Jr. et al. |
| 4,722,402 A | 2/1988 | Weldon |
| 4,785,247 A | 11/1988 | Meador et al. |
| 4,788,544 A | 11/1988 | Howard |
| 4,806,928 A | 2/1989 | Veneruso |
| 4,884,071 A | 11/1989 | Howard |
| 4,901,069 A | 2/1990 | Veneruso |
| 4,914,433 A | 4/1990 | Galle |
| 4,924,949 A | 5/1990 | Curlett |
| 4,953,636 A | 9/1990 | Mohn |
| 5,008,664 A | 4/1991 | More et al. |
| 5,052,941 A | 10/1991 | Hernandez-Marti et al. |
| 5,148,408 A | 9/1992 | Matthews |
| 5,248,857 A | 9/1993 | Ollivier |
| 5,278,550 A | 1/1994 | Rhein-Knudsen et al. |
| 5,302,138 A | 4/1994 | Shields |
| 5,311,661 A | 5/1994 | Zifferer |
| 5,332,049 A | 7/1994 | Tew |
| 5,334,801 A | 8/1994 | Mohn |
| 5,371,496 A | 12/1994 | Tanamachi |
| 5,454,605 A | 10/1995 | Mott |
| 5,455,573 A | 10/1995 | Delatorre |
| 5,505,502 A | 4/1996 | Smith et al. |
| 5,517,843 A | 5/1996 | Winship |
| 5,521,592 A | 5/1996 | Veneruso |
| 5,568,448 A | 10/1996 | Tanigushi et al. |
| 5,650,983 A | 7/1997 | Kondo et al. |
| 5,691,712 A | 11/1997 | Meek et al. |
| 5,743,301 A | 4/1998 | Winship |
| RE35,790 E | 5/1998 | Pustanyk et al. |
| 5,810,401 A | 9/1998 | Mosing et al. |
| 5,833,490 A | 11/1998 | Bouldin |
| 5,853,199 A | 12/1998 | Wilson |
| 5,856,710 A | 1/1999 | Baughman et al. |
| 5,898,408 A | 4/1999 | Du |
| 5,908,212 A | 6/1999 | Smith et al. |
| 5,924,499 A | 7/1999 | Birchak et al. |
| 5,942,990 A | 8/1999 | Smith et al. |
| 5,955,966 A | 9/1999 | Jeffryes et al. |
| 5,959,547 A | 9/1999 | Tubel et al. |
| 5,971,072 A | 10/1999 | Huber et al. |
| 6,030,004 A | 2/2000 | Schnock et al. |
| 6,041,872 A | 3/2000 | Holcomb |
| 6,045,165 A | 4/2000 | Sugino et al. |
| 6,046,685 A | 4/2000 | Tubel |
| 6,057,784 A | 5/2000 | Schaaf et al. |
| 6,104,707 A | 8/2000 | Abraham |
| 6,108,268 A | 8/2000 | Moss |
| 6,123,561 A | 9/2000 | Turner et al. |
| 6,141,763 A | 10/2000 | Smith et al. |
| 6,173,334 B1 | 1/2001 | Matsuzaki et al. |
| 6,177,882 B1 | 1/2001 | Ringgenberg et al. |
| 6,188,223 B1 | 2/2001 | van Steenwyk et al. |
| 6,196,335 B1 | 3/2001 | Rodney |
| 6,209,632 B1 | 4/2001 | Holbert et al. |
| 6,223,826 B1 | 5/2001 | Chau et al. |
| 6,349,767 B1 * | 2/2002 | Gissler .................. 166/242.6 |
| 6,367,565 B1 | 4/2002 | Hall |
| 6,392,317 B1 | 5/2002 | Hall et al. |
| 6,405,795 B1 | 6/2002 | Holbert et al. |
| 6,439,305 B1 * | 8/2002 | Bakke .................. 166/242.6 |
| 6,527,048 B1 * | 3/2003 | Trosclair .................. 166/242.7 |
| 6,641,434 B1 | 11/2003 | Boyle et al. |
| 6,655,464 B1 | 12/2003 | Chau et al. |
| 6,670,880 B1 | 12/2003 | Hall et al. |
| 6,688,396 B1 * | 2/2004 | Floerke et al. .............. 166/380 |
| 2002/0135179 A1 | 9/2002 | Boyle et al. |
| 2002/0193004 A1 | 12/2002 | Boyle et al. |
| 2003/0070842 A1 | 4/2003 | Bailey et al. |
| 2003/0213598 A1 | 11/2003 | Hughes |
| 2005/0046590 A1 * | 3/2005 | Hall et al. ................ 340/854.8 |
| 2005/0087368 A1 * | 4/2005 | Boyle et al. .................. 175/57 |

* cited by examiner

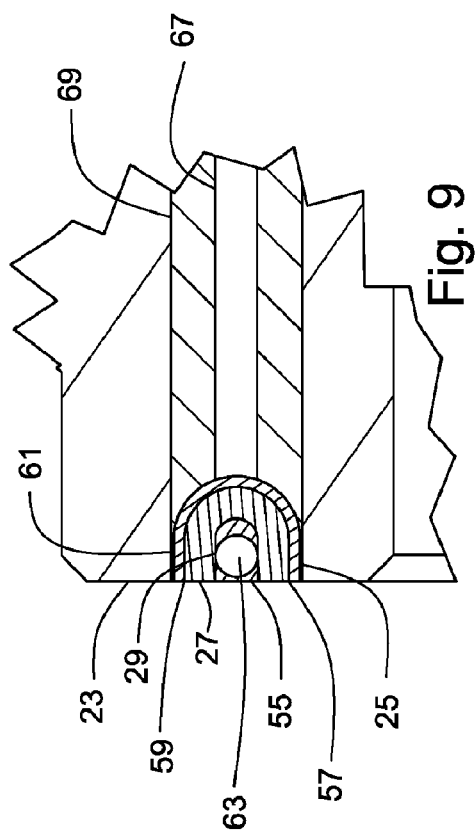
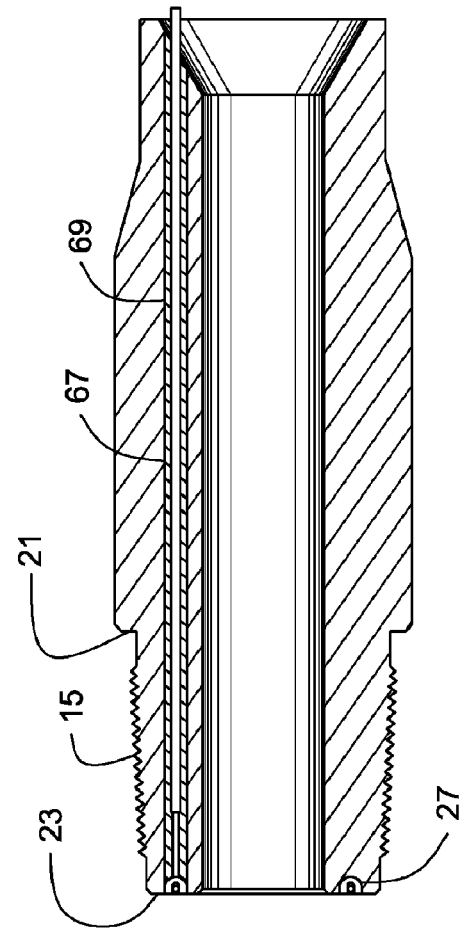
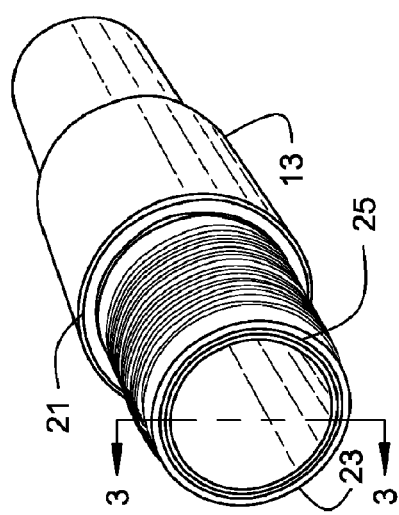

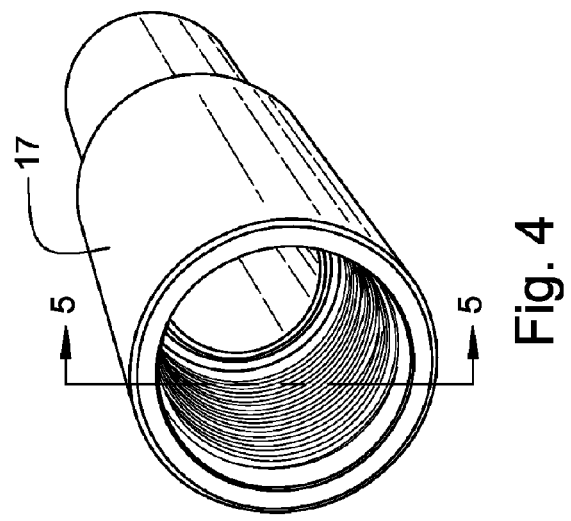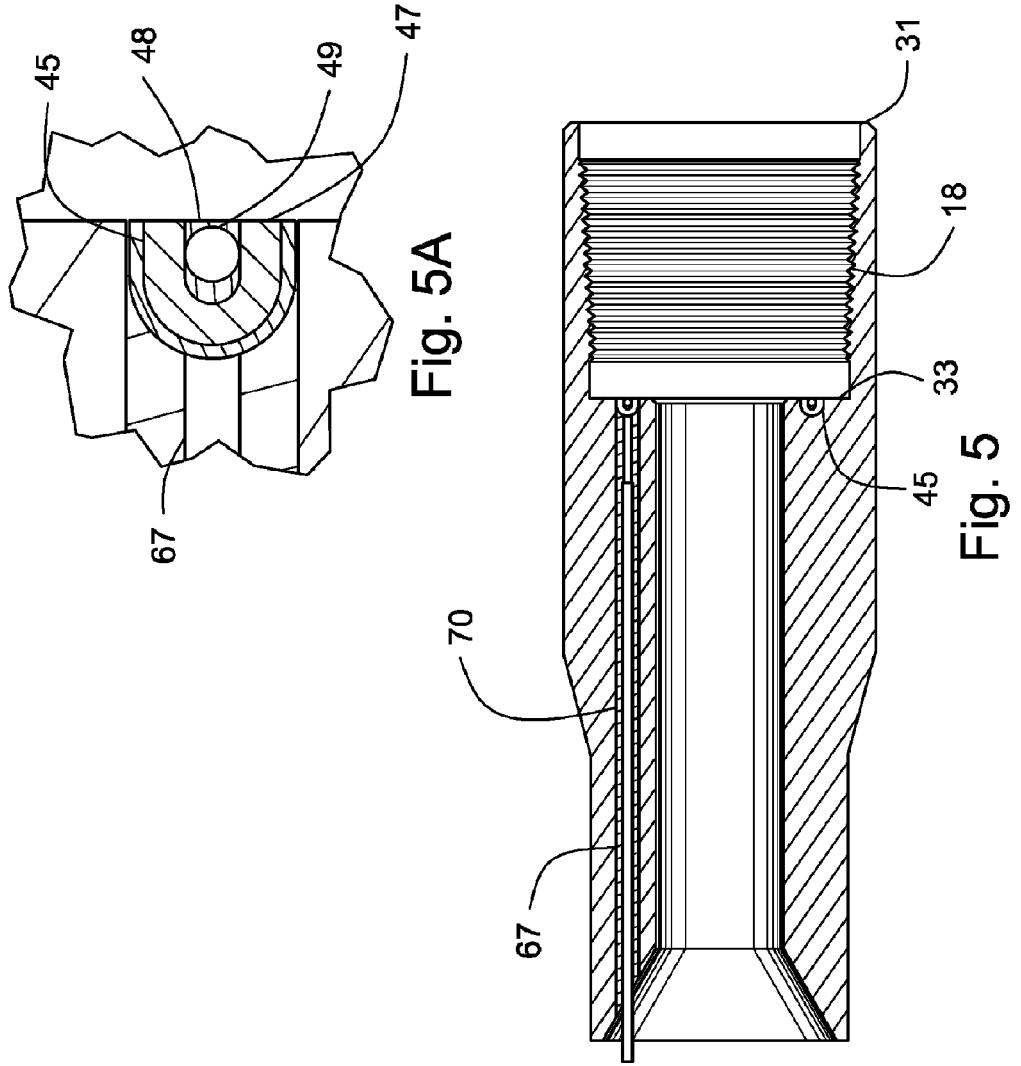

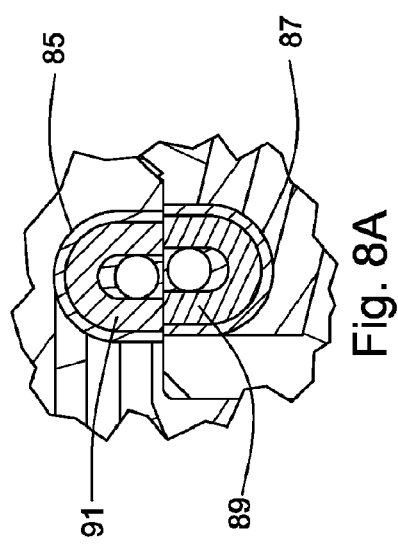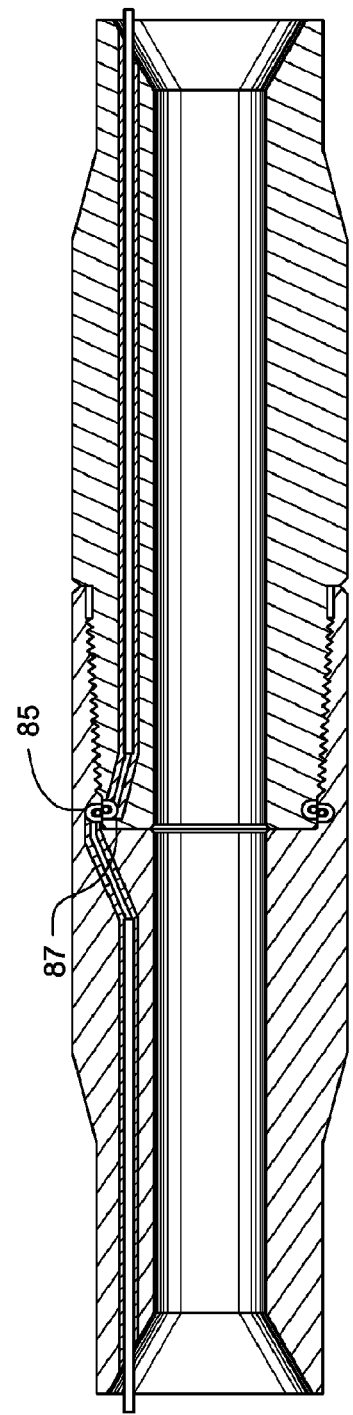

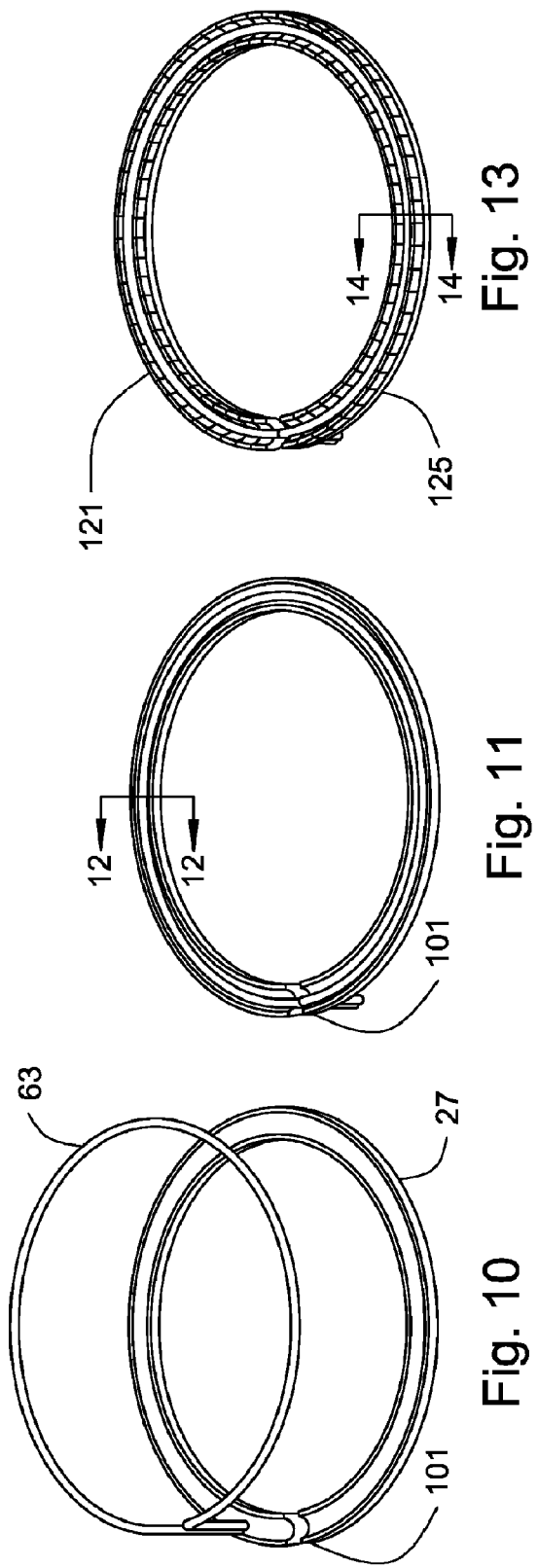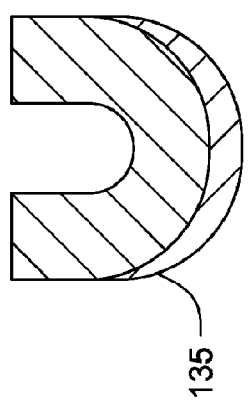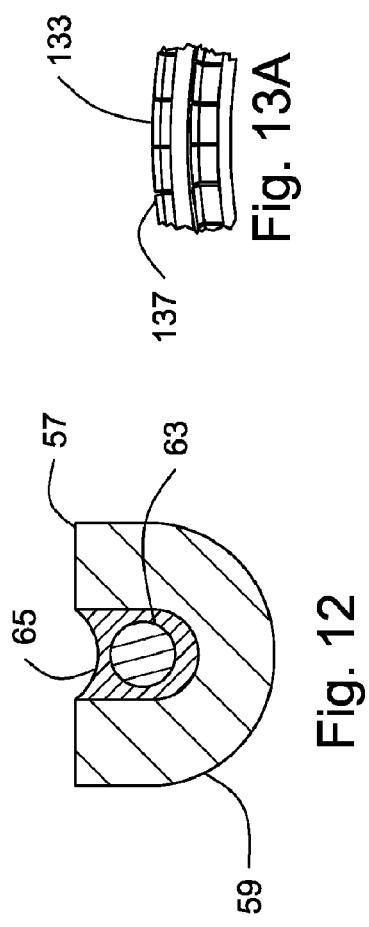

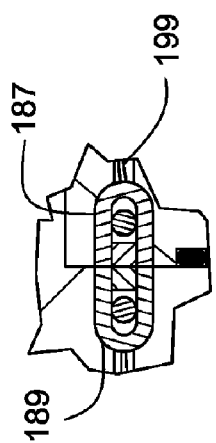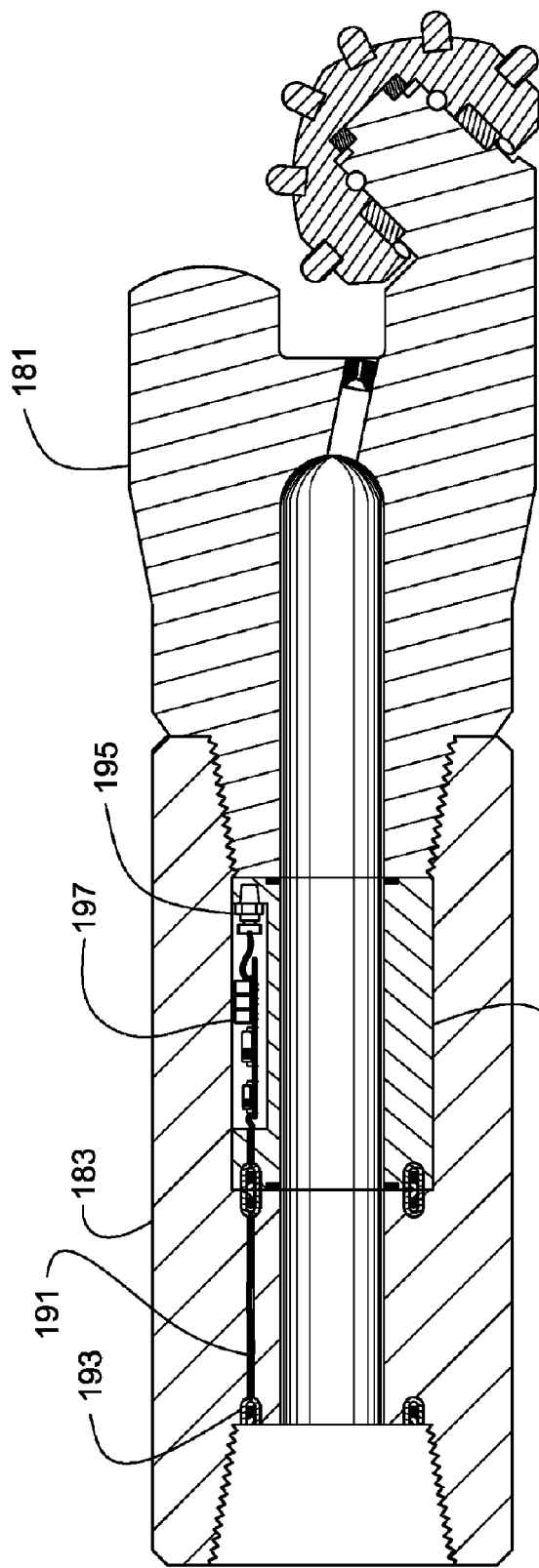

DOWNHOLE DATA TRANSMISSION SYSTEM

CROSS REFERENCE TO RELATED APPLICATIONS

The present application is a continuation of U.S. Pat. application Ser. No. 09/816,766 filed on Mar. 23, 2001 now U.S. Pat. No. 6,670,880 the entire disclosure of which is incorporated by reference herein. Said application, Ser. No. 09/816,766 is a continuation-in-part of U.S. Pat. application Ser. No. 09/619,084, filed Jul. 19, 2000, the entire disclosure of which was incorporated by reference into U.S. application Ser. No. 09/816,766. Therefore, the relevant portions of the specification and drawing figures of U.S. Pat. application Ser. No. 09/619,084 have been copied now into the present application.

FEDERAL RESEARCH STATEMENT

This invention was made with government support under Contract No. DE-FC26-97FT343656 awarded by the U.S. Department of Energy. The government has certain rights in the invention.

BACKGROUND OF INVENTION

The present invention relates to the field of data transmission systems, particularly data transmission systems suitable for use in downhole environments, such as along a drill string used in oil and gas exploration, or along the casings and other equipment used in oil and gas production.

The goal of accessing data from a drill string has been expressed for more than half a century. As exploration and drilling technology has improved, this goal has become more important in the industry for successful oil, gas, and geothermal well exploration and production. For example, to take advantage of the several advances in the design of various tools and techniques for oil and gas exploration, it would be beneficial to have real time data such as temperature, pressure, inclination, salinity, etc. Several attempts have been made to devise a successful system for accessing such drill string data. These systems can be broken down into four general categories.

The first category includes systems that record data downhole in a module that is periodically retrieved, typically when the drill string is lifted from the hole to change drill bits or the like. Examples of such systems are disclosed in the following U.S. Patents: 3,713,334; 4,661,932 and 4,660,638. Naturally, these systems have the disadvantage that the data is not available to the drill operator in real time.

A second category includes systems that use pressure impulses transmitted through the drilling fluid as a means for data communication. For example, see U.S. Pat. No. 3,713,089. The chief drawbacks to this mud pulse system are that the data rate is slow, i.e. less than 10 baud; the system is complex and expensive; the results can be inconsistent; and the range of performance can be limited. In spite of these drawbacks, it is believed that this mud pulse system is the only real time data transmission system currently in commercial use.

The third category includes systems that transmit data along an electrical conductor that is integrated by some means into the drill string. Examples of such systems are disclosed in the following U.S. Patents: 3,879,097; 4,445,734 and 4,953,636.

U.S. Pat. No. 4,445,734, incorporated herein by this reference, teaches the use of a wire secured within the pipe by a liner. The wire is connected to annular contacts at each joint. The contact mechanism includes a means for wiping the surfaces of the contacts and of exerting pressure on the contacts in order to ensure efficient signal transmission.

Because the drill string can be comprised of several hundred sections of drill pipe, it is desirable to locate the electrical system within each section of pipe and then provide for electrical connections when the sections are joined together. A decided drawback of such systems is the fact that the downhole environment is quite harsh. The drilling mud pumped through the drill string is abrasive and typically has a high salt content. In addition, the downhole environment typically involves high pressures and temperatures. Moreover, heavy grease is typically applied at the joints between pipe sections. Consequently, the reliance on an electrical contact between joined pipe sections is typically fraught with problems.

A fourth category includes systems that use a combination of electrical and magnetic principles. In particular, such systems have an electrical conductor running the length of the drill pipe and then convert the electrical signal into a corresponding magnetic field at one end. This magnetic field is passed to the adjacent drill pipe and then converted to back to an electrical signal. Examples of such systems are described below.

U.S. Pat. No. 2,379,800 to Hare describes a system with a primary transformer coil, consisting of a wire wound around a soft iron core, being installed within an annular groove at one end of the pipe and a similar, secondary transformer coil, being installed within an annular groove at the other end of the pipe. When the pipes are connected, the primary and secondary coils are brought close together. Once the signal is transmitted across the joint, it is carried along the drill pipe by a wire connected to the coil in the opposite end of the pipe. The system also included condensers, rectifiers, and amplifiers to aid the transmission of the signal from one pipe to another.

U.S. Pat. No. 2,414,719 to Cloud, discloses a serial inductive coupling system including a series capacitor in each link to tune the system to a given pass band, typically around 3 kHz. The capacitor has the undesired feature of providing a narrow bandwidth. Cloud also suggested the use of a U-shaped trough of a "magnetic member" (see reference numeral 56 in FIG. 9). The materials suggested for this magnetic member include "Armco iron, nickel alloy, and magnetic steel." All of these materials conduct electricity. As such, it is believed that eddy currents develop in this magnetic member, thereby lowering the efficiency of the system.

U.S. Pat. No. 3,090,031 to Lord proposed an improvement to the Hare Patent to help reduce the power required in the transformer system. Lord's patent describes a circuit similar to Hare's but with the addition of a transistor and the use of mercury-type penlight batteries as a power source at each joint. As an alternative power source, he proposed the use of chemical additives to the drilling fluid that could provide power to the transformers by electrolytic action.

U.S. Pat. No. 4,788,544 to Howard describes a system that utilized a Hall Effect sensor as a means to bridge the drill pipe joint. In this system, an electromagnetic field generating coil having a ferrite core is employed to transmit data signals across the joint. The magnetic field is sensed in the adjacent pipe through a "Hall effect sensor"(no relation to the present inventors). The Hall effect sensor produces an electrical signal corresponding to the magnetic field strength and sends the signal along a conductor wire to the coil and the next joint.

Although U.S. Pat. Nos. 4,806,928 and 4,901,069 to Veneruso do not describe a system that is incorporated into individual sections of drill pipe; these patents do show a system for electromagnetic coupling a cable passing through the well bore to a downhole tool. The system described includes inner and outer induction coils which are cooperatively arranged and adapted so that one of coils can be dependently suspended from a well bore cable and lowered into coaxial alignment with the other coil that is positioned within the well bore and electrically connected to a downhole apparatus.

Another example of a downhole data transmission system that uses the principles of induction is described in U.S. Pat. No. 4,605,268 to Meador. This patent shows a current-coupled system that uses two toroidal coils at each joint. Each coil is confined within an electrically conducting housing. A first electrically conducting housing surrounding the first coil, located in the end of one drill string component, is electrically connected to a second electrically conducting housing for the second coil, located in the end of the adjacent drill string component. In this way, as an electrical current is induced by the first coil in the first electrically conducting housing, that electrical current is conducted to the second electrically conducting housing, whereupon, a magnetic field is induced in the second coil. Thus, although the principles of induction are used, the system in the "268 patent relies on an electrical connection between adjacent components of the drill string. As such, it is subject to the problems described above in connection with the third category of systems.

SUMMARY OF INVENTION

Briefly stated, the invention is a system for transmitting data through a string of downhole components.

The object of the present invention is to provide a highly reliable communications system for power transmission and for sending and receiving data along a drill string. This is achieved by means of an electromagnetic inductive coupler capable of power transmission and of transmitting and receiving a low power, high frequency, multiplexing carrier signal of greater than 10 kilobaud along the length of the drill string. In this manner, information on the sub-terranean conditions encountered during drilling and on the condition of the drill bit and other drill-string components may be communicated to the technicians located on the drilling platform. Furthermore, technicians on the surface may communicate directions to the drill bit and other downhole devices in response to the information received from the sensors, or in accordance with the pre-determined parameters for drilling the well.

The coupler consists of a means for producing an electromagnetic field positioned within the tool joints of each section of drill pipe. Within the pipe sections, the couplers are connected by means of a conductor medium attached within the wall of the pipe bore. A low-wattage power source is provided and is placed in communication with at least one of the couplers. When the pipe sections are joined together, the respective couplers are in sufficiently close proximity that they share and electromagnetic field capable of transmitting power and sending and receiving the carrier signal. Without the aid of an additional power source or repeater to boost the signal, the signal may be transmitted along the conductor at least across the next joint. In this manner power and data may be transmitted along the entire drill string.

Another object of this invention is to provide a power and carrier signal that is resistant to the flow of drilling fluid, drill string vibrations, and electronic noise associated with drilling oil, gas, and geothermal wells.

Another object of this invention is to transmit and receive a carrier signal across several lengths of drill pipe without the aid of repeaters and additional electronic circuitry. This reduces the complexity of the communication system and increases its reliability.

Another object of this invention is to provide a coupler that is transparent to make up methods employed on the drilling platform, as well as maintenance procedures employed in re-machining the tool joints.

In accordance with one aspect of the invention, the system includes a plurality of downhole components, such as section of pipe in a drill string. Each component has a first end and a second end, the first end of one downhole component being adapted to be connected to the second end of another downhole component.

Located proximate to the first end is a first magnetically conductive, electrically insulating element. This element includes a first U-shaped trough with a bottom, first and second sides and an opening between the two sides. A second magnetically conductive, electrically insulating element is located proximate the second end of each downhole component. This second element likewise includes a second U-shaped trough with a bottom, first and second sides and an opening between the two sides. The first and second troughs are configured so that the respective first and second sides and openings of the first and second troughs of connected components are substantially proximate to and substantially aligned with each other.

A first electrically conducting coil is located in each first trough, while a second electrically conducting coil is located in each second trough.

An electrical conductor is in electrical communication with and runs between each first and second coil in each component.

In operation, a varying current applied to a first coil in one component generates a varying magnetic field in the first magnetically conductive, electrically insulating element, which varying magnetic field is conducted to and thereby produces a varying magnetic field in the second magnetically conductive, electrically insulating element of a connected component, which magnetic field thereby generates a varying electrical current in the second coil in the connected component.

In accordance with another aspect of the invention, the system includes a plurality of downhole components, each with a pin end and a box end. Each pin end includes external threads tapering to a pin face, while each box end includes internal threads tapering to a shoulder face within the box end. The pin face and shoulder face are aligned with and proximate each other when the pin end of the one component is threaded into a box end of the other component. A first inductive coil located within a recess formed in each pin face, while a second inductive coil located within a recess formed in each shoulder face. An electrical conductor is included which is in electrical communication with and runs between each first and second coil in each component.

In accordance with another aspect of the invention, the system includes a plurality of downhole components, each with a first end and a second end, the first end of one downhole component being adapted to be connected to the second end of another downhole component. A first electrically conducting coil having no more than five turns, and preferably no more than two, most preferably no more than one, is placed at each first end, while a second electrically conducting coil having no more than five turns, and preferably no more than two, most preferably no more than one, is placed at each second end. The first and second coils of connected components are configured so as to be substantially proximate to and substantially aligned with each other. An electrical conductor is provided which is in electrical communication with and runs between each first and second coil in each component. In operation, a varying current applied to a first coil in one component generates a varying magnetic field, which magnetic field induces a varying electrical current in the second coil in the connected component, to thereby transmit a data signal.

In accordance with another aspect, the invention is a downhole tool adapted to transmit data over the systems described above.

The present invention provides the advantage that, as the data transmission line uses alternating conductive and inductive elements, the inductive elements at the end of each segment enable the transmission line to be lengthened or shortened during drilling operations without need for an electrically conductive path across the joint. Indeed, the only closed electrical path is within each individual element, which constitutes a single closed path for electrical current.

It should be noted that, as used herein, the term "downhole" is intended to have a relatively broad meaning, including such environments as drilling in oil and gas, gas and geothermal exploration, the systems of casings and other equipment used in oil, gas and geothermal production.

It should also be noted that the term "transmission" as used in connection with the phrase data transmission or the like, is intended to have a relatively broad meaning, referring to the passage of signals in at least one direction from one point to another.

It should further be noted that the term "magnetically conductive" refers to a material having a magnetic permeability greater than that of air.

It should further be noted that the term "electrically insulating" means having a high electrical resistivity, preferably greater than that of steel.

The present invention, together with attendant objects and advantages, will be best understood with reference to the detailed description below in connection with the attached drawings.

BRIEF DESCRIPTION OF DRAWINGS

FIG. 2 is a perspective view of the pin end of the section of drill pipe of FIG. 1.

FIG. 3 is a cross-sectional view along line 3—3 of FIG. 2.

FIG. 4 is an enlarged perspective view of the box end of the section of drill pipe of FIG. 1.

FIG. 5 is a cross-sectional view along line 5—5 of FIG. 4.

FIG. 5A is an enlarged partial view taken from FIG. 5.

FIG. 8 is a cross-sectional view similar to FIG. 6 showing an alternative placement of the recess and MCEI elements.

FIG. 8A is an enlarged partial view taken from FIG. 8.

FIG. 9 is an enlarged cross-sectional view from FIG. 3 showing the placement of the magnetically conductive, electrically insulating (MCEI) element in the recess in the pin end of FIG. 2.

FIG. 10 is an exploded perspective view of a MCEI element and a coil.

FIG. 11 is a perspective view showing the coil placed in the MCEI element of FIG. 10.

FIG. 12 is a cross-sectional view along line 12—12 of FIG. 11.

FIG. 13 is a perspective view of a more preferred embodiment of the MCEI element.

FIG. 13A is an enlarged view of a portion of the MCEI element of FIG. 13.

FIG. 14 is a cross-sectional view along line 14—14 of FIG. 13.

FIG. 18 is a cross-sectional view showing a drill bit and a sub containing a sensor module.

FIG. 18A is an enlarged cross-sectional view from FIG. 18.

DETAILED DESCRIPTION

Figure 1:
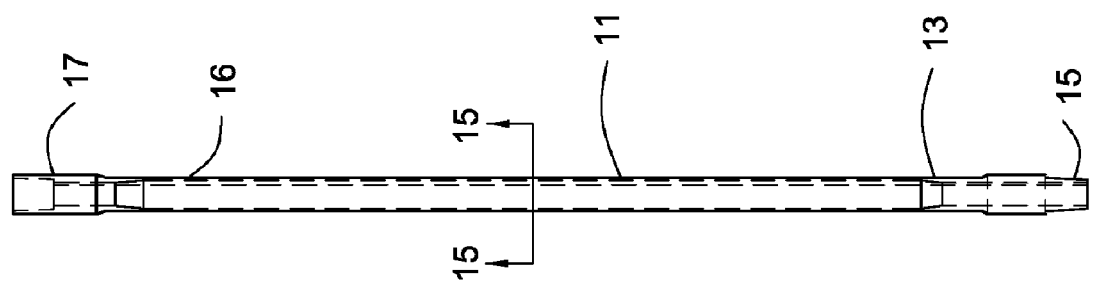
FIG. 1 is a perspective view of a section of drill pipe including the data transmission system of the preferred embodiment.
Figure 1A:
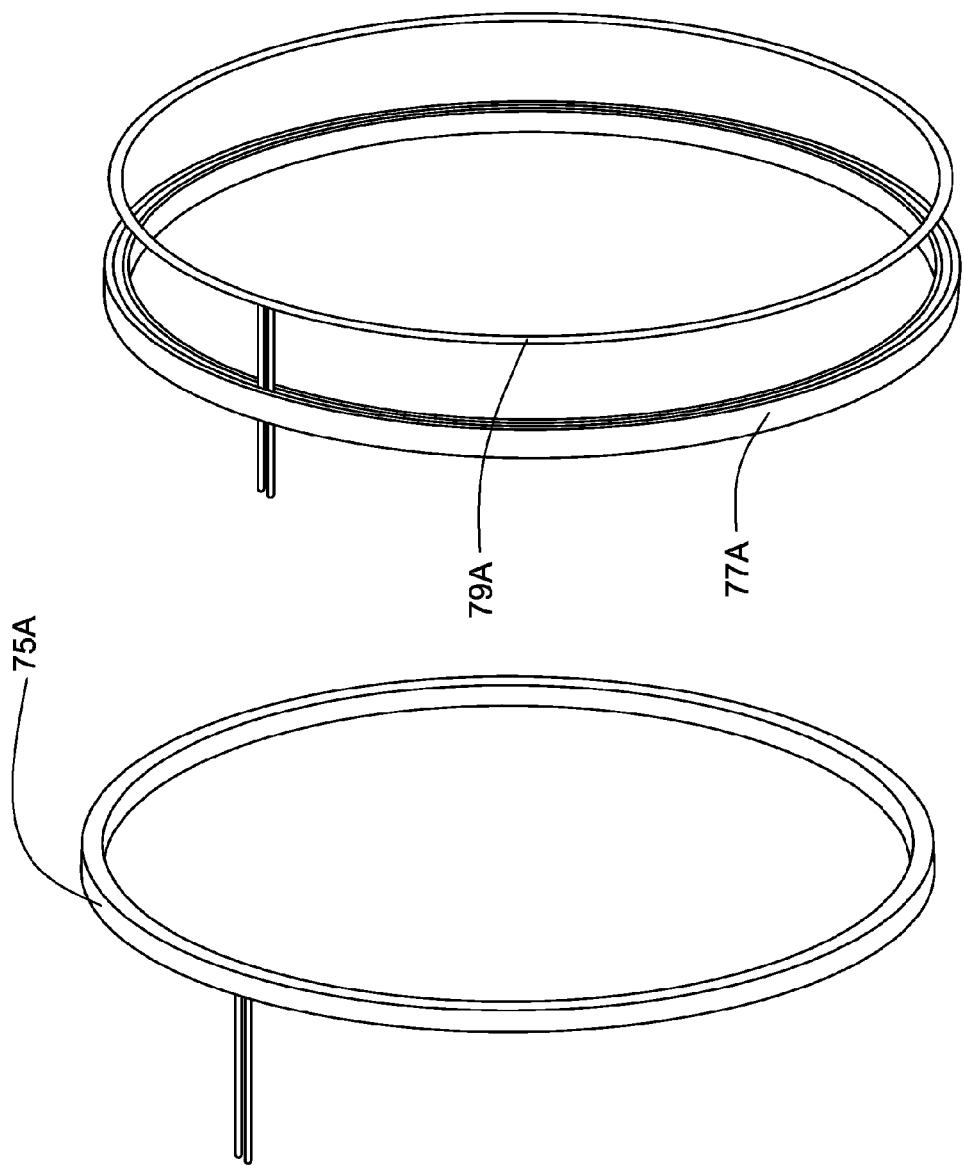
FIG. 1A is a representation of a coupler of the present invention.

FIG. 1A is a representation of a coupler of the present invention. The coupler consists of an Archimedean coil, or planar, radially wound, annular coil 79A, inserted into a core 77A. The annular coils may also be wound axially within the core material and may consist of one or more than one layers of coils. The assembled coupler 75A is then fixed into a groove within the pipe joint. The core material may be a metal or metal tape material having magnetic permeability, such as iron, powdered iron, a hard or soft ferrite, or a ceramic. Surprisingly, the core material may even be a material without magnetic permeability such as a polymer. Tests conducted in the course of this invention have shown good results using a PVC core. When the coil is energized, the magnetic field produced is sufficient to couple with a similar coil proximately located in the mating joint. It has been determined that core materials having magnetic permeability produce a stronger magnetic coupling with a slight drop in the resonant frequency, which may be an indicator of increased coil inductance. This focusing property of permeable materials may be especially useful in the transmission of power and data across the joint.

Figure 2A:
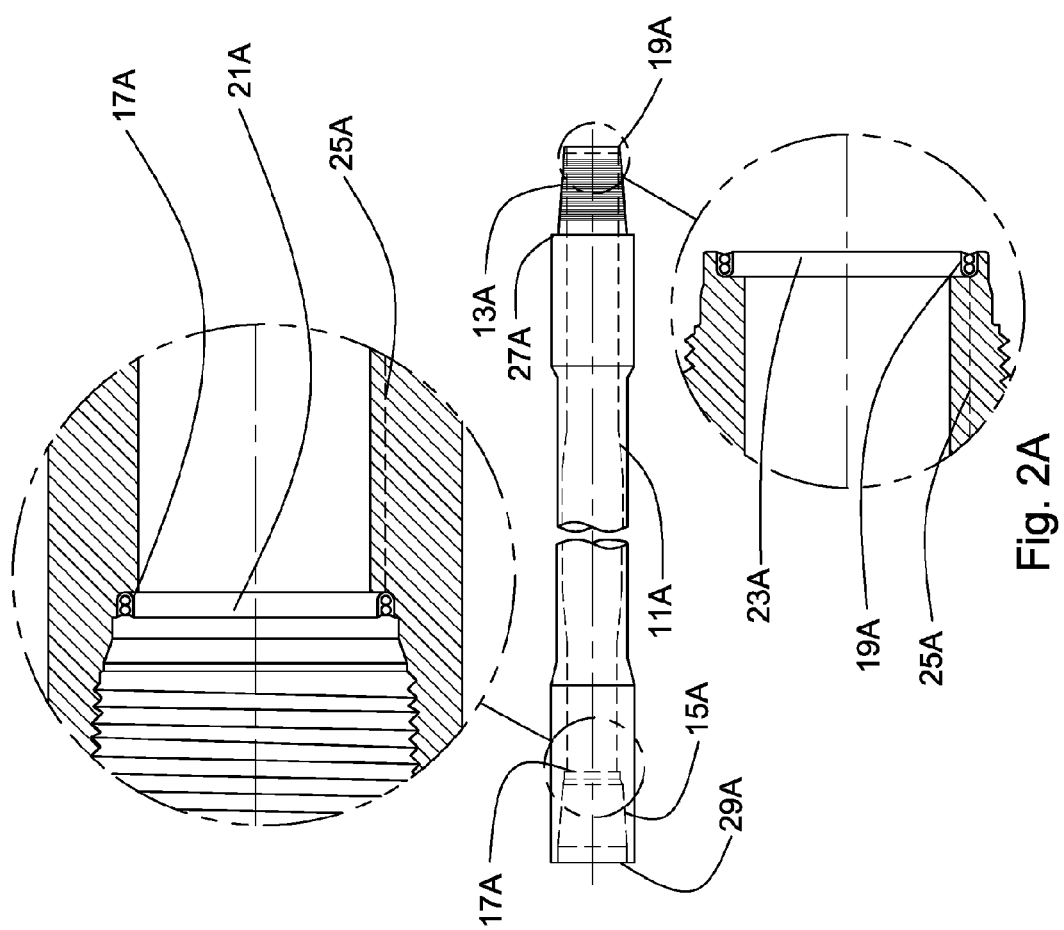
FIG. 2A is a representation of a section of drill pipe adapted to receive an electromagnetic coupler of this invention.

FIG. 2A is a representation of a drill pipe adapted for the present invention. It consists of a tube 11A welded to a threaded pin end tool joint 13A and a threaded box end tool joint 15A. Grooves 17A and 19A are provided in the respective tool joints as a means for housing the electromagnetic coupler. The coupler comprises a toroidal core 21A and 23A having magnetic permeability about which a radial or Archimedean coil is wound. The laminated and tape wound, or solid, core comprises a material selected from the group consisting of ferromagnetic materials, irons, powdered irons, ferrites, or composite ceramics, or a combination thereof. Experiments were even conducted using a PVC core with good results. Iron and ferrite cores are preferred since they reduce eddy currents in the surrounding metal pipe that weaken strength of the field, and such cores increase the density of magnetic flux and tend to focus the magnetic field toward the opposing coupler. A rounded groove 25A is formed within the bore wall for conveying an insulated conductor means along the pipe. The conductor means is attached within the groove and shielded from the abrasive drilling fluid. The conductor means may consist of wire strands or a coaxial cable. The conductor means is mechanically attached to each of the coils. As an alternative to the coils, it has been found that traces on a printed board may also be used with the advantage of manufacturing expediency. When installed into the grooves, the couplers are potted in with an abrasion resistant material in order to protect them from the drilling fluid. The simplicity of the design of this invention creates a coupler having reliability as high as the pipe itself.

The electromagnetic couplers may be axially stacked within the bore of the pipe as a means for accommodating maintenance of the tool joints. As the pipes are assembled and disassembled, shoulders 27A and 29A will often become damaged. These shoulders are the primary seal for the pipe joint, and a leak at the joint may cause a "wash out"and catastrophic failure of the joint, itself. Therefore, it is necessary to re-machine the sealing surface of the joint, resulting in a change of length of pin and box ends. In order to compensate for the change in length, the internal shoulder housing the electromagnetic coupler may also have to be re-machined. In a staked configuration, the outside coupler may be machined away to compensate for the change of length of the tool joint and fresh coupler exposed in its place. Normally, three re-machinings of the pipe joint are allowed before the threads must be recut. Therefore, a stack of three couplers may be provided in each joint as a means for allowing for the maintenance of the joint without having to reinstall the entire system. Another method that would accommodate maintenance of the tool joints would be to provide for a mechanical connector between the coupler and the shoulder of the groove. The attached conductor means could then be permanently attached to the female side of the connector and the coupler could be attached to the male side. The female side of the coupler could be of a sufficient width to allow for re-machining. Then, when maintenance of the tool joints is required, the coupler could be removed, the joints along with the female side of the connector re-machined, and the couplers reinstalled.

Figure 3A:
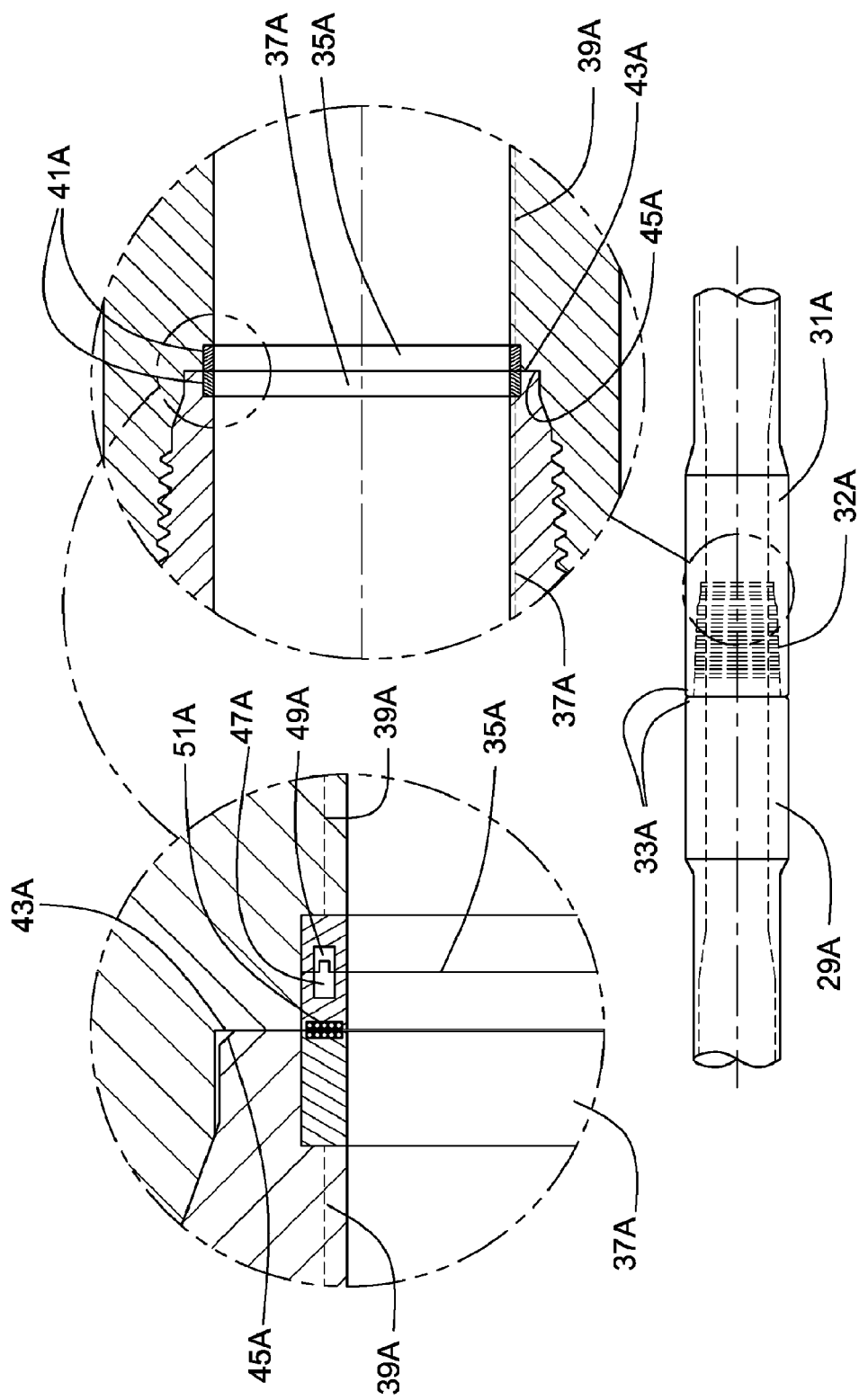
FIG. 3A is a representation of a made up section of drill pipe detailing a coupler of the present invention.

FIG. 3A is a representation of the made up drill pipe joint adapted to receive the electromagnetic inductive coupler of this invention. Drill pipe pin end tool joint 29A is shown mechanically attached to the box end tool joint 31A of another pipe by means of the mating threads 32A. The tool joints are screwed together until the external shoulders 33A are compressed together forming the primary seal for the joint. This seal prevents the loss of drilling fluid and bore pressure during drilling. Should the seal fail, there would be a loss of bore pressure, and the escaping fluid would erode away the threads and joint surfaces resulting in a catastrophic failure of the joint, or a "wash out". When the joint is made up, it is torqued to a preload equal to approximately one half of the torsional yield strength of the pipe, itself. The preload is dependent on the wall thickness and diameter of the pipe, and may be as high as 70,000 foot pounds. The grooves should have rounded corners in order to reduce stress concentration in the wall of the pipe. Groove 35A is provided in the internal shoulder 43A of box end 31A and groove 37A is provided in the nose portion 45A of pin end 29A. As the joint is made up, these grooves become concentrically aligned and adjacent one another. The cores 41A of the couplers are installed in grooves 35A and 37A and are potted in place to protect them from damage by the circulating drilling fluid and tools that may be deployed down the bore of the drill pipe. A rounded groove 39A is provided along the wall the bore and the conductor means, consisting of a wire or coaxial cable, is attached within the groove connecting the coupler of the box end to the coupler of the pin end in each pipe. Groove 39A may be either a longitudinal groove or a spiral groove along the bore wall. Coils 51A and 53A and are provided in the core 41A and are radially wound so that when the joint is made up they are face to face. This coil configuration may be referred to as Archimedean coils. Alternatively, but not shown, the means for producing a magnetic field may consist of coils axially wound around a suitable core configuration. The coils produce a magnetic field that is focused toward each other due to the magnetic permeability of the core material. When the coils are in close proximity, they share their magnetic fields, resulting in electromagnetic coupling across the joint. Although is not necessary for the couplers to contact each other for the coupling to occur, the applicants have found that the closer they are to one another the stronger the coupling effect. The coupled magnetic field, then, is capable of transmitting a carrier signal across the conductor medium to coupler at the opposite end of the pipe section. As described before, in the place of the coil configuration, traces on a printed circuit board may be used to create a similar coupling effect. The core may be of sufficient depth to permit the stacking of coils in order to permit re-machining of the shoulder and nose portion of the joints. Alternatively, a mechanical connector may be provided having a male end 47A and female end 49A so that the coils maybe detached in order to permit re-machining of the joint. The coils are capable of producing a sufficient magnetic field using very low power of less than 1.0 watts. The practical advantage of the low wattage requirements of the couplers is that miniature batteries, or even a downhole generator, may be used to power more than one coupler in series over the length of time required to power the system between one or more trips of the drill string, usually a hundred hours or more. Furthermore, low wattages will accommodate a high frequency signal.

These small batteries may also be installed within the drill pipe wall, or within the wall of a specially designed sub assembly, without materially affecting the strength of the pipe.

Referring to the drawings, FIG. 1 is a perspective view of a section of drill pipe 11 including the data transmission system of the present invention. The most preferred application of the data transmission system is in sections of drill pipe, which make up a drill string used in oil and gas or geothermal exploration. Alternatively, other downhole components within which the data transmission system can be incorporated include such downhole tools such as drill bits, data sensors, crossover subs, and motors.

Figure 21:
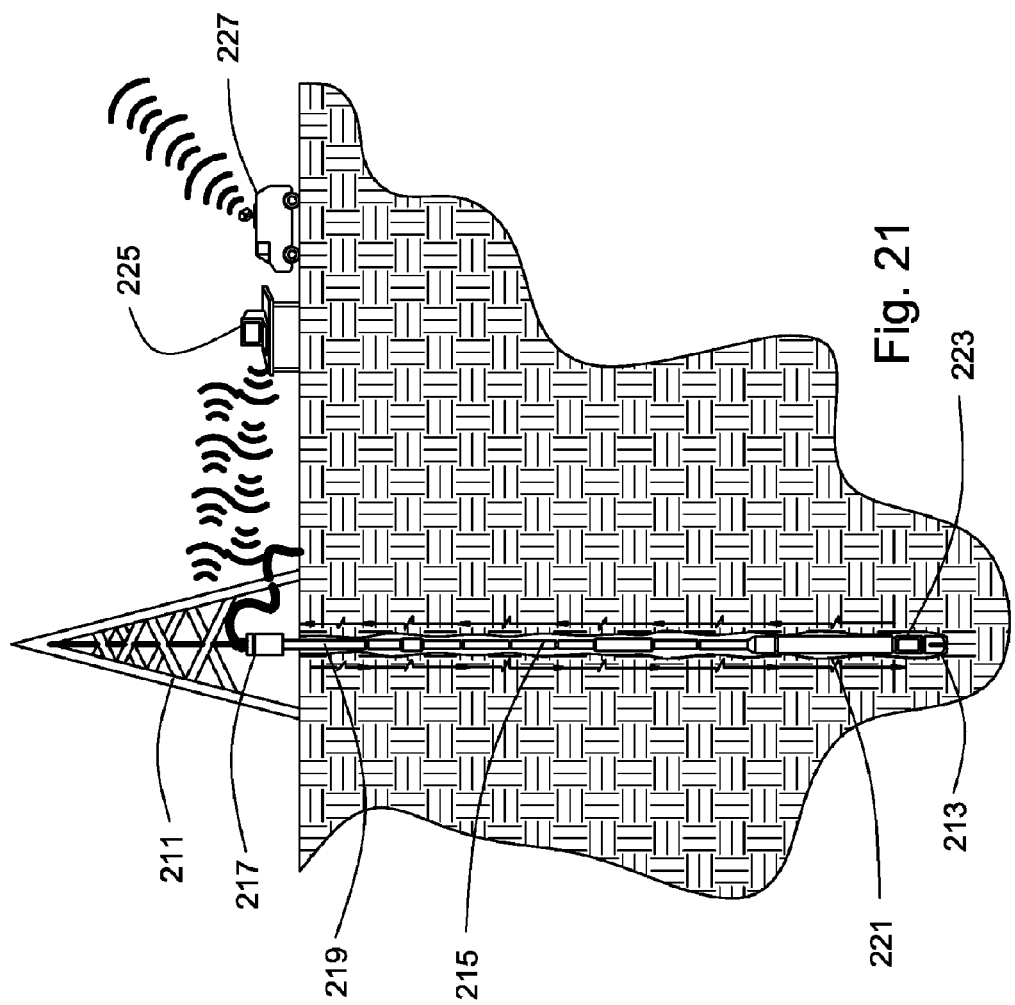
FIG. 21 is a schematic representation of the downhole transmission system in use on a drilling rig.

FIG. 21 schematically illustrates a drilling operation making use of downhole components having the data transmission system of the present invention. The operation includes a rig 211. A data transceiver 217 is fitted on top of the kelly 219, which is, in turn, connected to a string of drill pipe 215. Also within the drill string are tools such as jars and stabilizers. Drill collars and heavyweight drill pipe 211 are located near the bottom of the drill string. A sensor module 223 is included just above the bit 213. As will be discussed in more detail below, each of these components forms part of the drilling network.

The data transmission system of the present invention may also be used with the casings, sensors, valves, and other tools used in oil and gas, or geothermal production.

The depicted section 11 includes a pin end 13, having external tapered threads 15 (see FIG. 2), and a box end 17, having internal tapered threads 18 (see FIG. 4). Between the pin end 13 and box end 17 is the body 16 of the section. A typical length of the body 16 is 30 and 90 feet. Drill strings in oil and gas production can extend as long as 20,000 feet, which means that as many as 700 sections of drill pipe and downhole tools can be used in the drill string.

Figure 6:
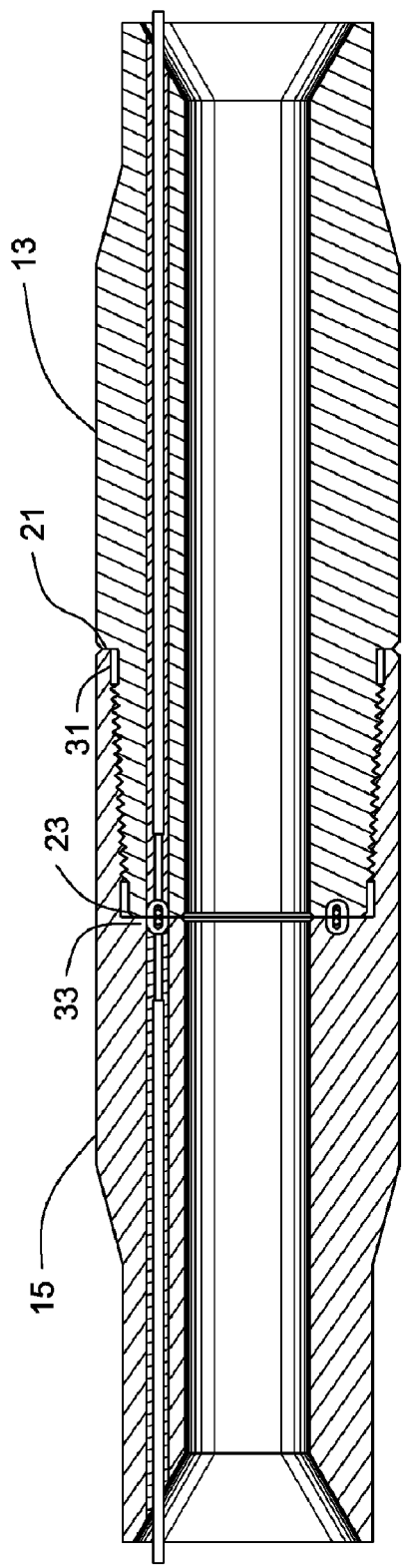
FIG. 6 is a cross-sectional view showing the pin end of FIGS. 2 and 3 connected to box end of FIGS. 4 and 5.

There are several designs for the pin and box end of drill pipe. At present, the most preferred design to use with the present invention is that which is described in U.S. Pat. No. 5,908,212 to Grant Prideco, Inc. of Woodlands, Tex., the entire disclosure of which is incorporated herein by reference. As shown in FIGS. 2 and 3, the pin end 13 includes an external, primary shoulder 21, and an internal, secondary shoulder or face 23. As shown in FIGS. 4 and 5, the box end 15 includes and external, primary shoulder 31 and an internal, secondary shoulder or face 33. As shown in FIG. 6, when two sections of drill pipe are connected, the pin end 13 is threaded into the box end 15 with sufficient force so that the primary external shoulder 21 on the pin end engages the primary shoulder face 31 on the box end. As a result of this connection being indexed by the primary shoulder 21 and the primary shoulder face 31, the face 23 on the pin end is reliably brought into close proximity or contact with the shoulder 33 on the box end. The advantages this provides to the present invention will be discussed below.

Figure 7:
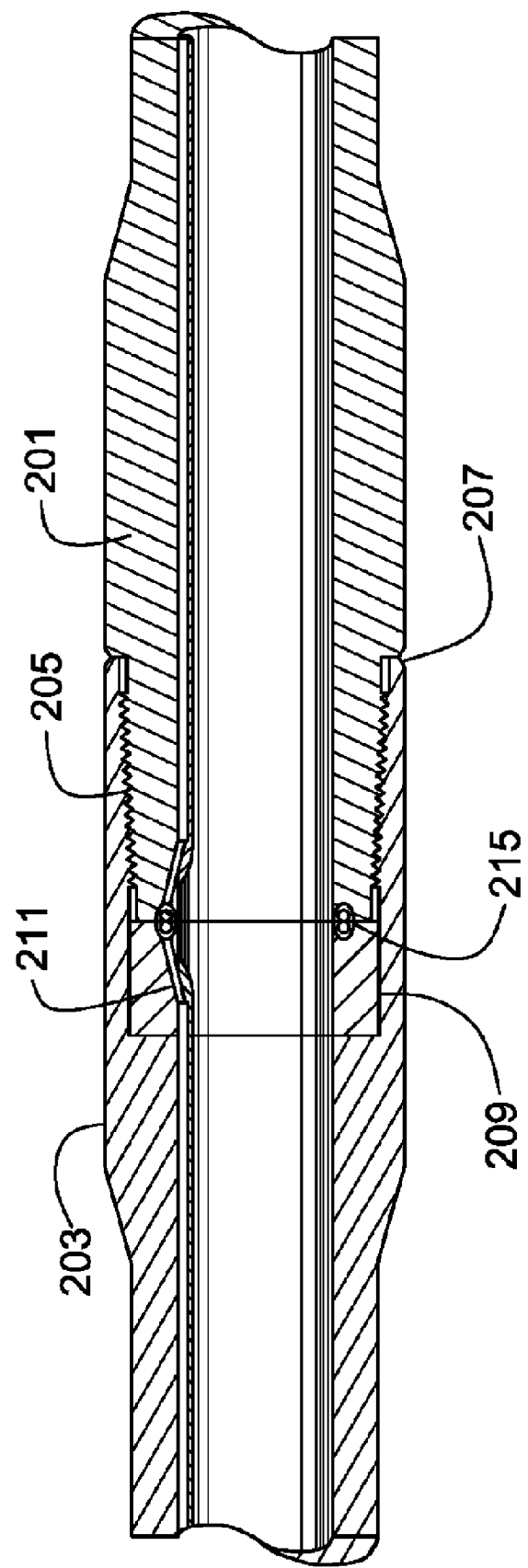
FIG. 7 is a cross-sectional view showing the connection of an alternate design of a pin end and a box end.

An alternate design for the pin and box end is disclosed in U.S. Pat. No. 5,454,605, assigned to Hydrill Company, Houston, Tex. As seen in FIG. 7, the pin end 201 is cooperatively engaged with the box end 203 forming a junction of the pipe ends. Thread form 205 is unique in that it is wedged shaped and totally engaged in order to distribute all the bearing stresses resisting torsional makeup. When the joint is fully engaged, a gap 207 occurs between the primary shoulders. No sealing or load bearing is provided by the shoulders adjacent the threads of the pin and box ends. An insert 209 is provided in the box end to house the MCEI elements 215 of the present invention. Mating elements 215 are provided in recesses in the pin end. An electrical conductor 211 is provided for transmitting the carrier signal along the length of the drill pipe to the opposite end not shown. An insert, not shown, also may be provided in the pin end in order to accommodate further modification in design.

As shown in FIGS. 2, 3, and 9, the pin end 13 preferably includes a recess 25 in the secondary shoulder or face 23. Preferably, the recess is located so as to lie equidistant between the inner and outer diameter of the secondary shoulder or face 23. Alternatively, the recess is formed at either the inner or the outer diameter of the face, thereby creating a recess that is open on two sides.

Preferably, the recess is machined into the face by conventional tools either before or after the tool joint is attached to the pipe. The dimensions of the recess can be varied depending on various factors. For one thing, it is desirable to form the recess in a location and with a size that will not interfere with the mechanical strength of the pin end. Further, in this orientation, the recesses are located so as to be substantially aligned as the joint is made up. Other factors will be discussed below.

As can be seen in these figures, the recess is preferably configured so as to open axially, that is, in a direction parallel to the length of the drill string. In an alternative embodiment shown in FIGS. 8 and 8A, the recesses 85 and 87 are located on the outside diameter of the pin end 81 and on the inside diameter of the box end 83. In this way, the recesses are configured so as to open radially, that is, in a direction perpendicular to the length of the drill string. As depicted in FIG. 8A, the MCEI elements 89 and 91 may be slightly offset in order to accommodate manufacturing tolerances. This offset configuration does not materially affect the performance of the inductive elements of the present invention whether in an axial or radial configuration.

A typical drill pipe alloy, 4140 alloy steel, having a Rockwell C hardness of 30 to 35, has a magnetic permeability of about 42. The magnetic permeability of a material is defined as the ratio of the magnetic flux density B established within a material divided by the magnetic field strength H of the magnetizing field. It is usually expressed as a dimensionless quantity relative to that of air (or a vacuum). It is preferably to close the magnetic path that couples the adjacent coils with a material having a magnetic permeability higher than the steel. However, if the magnetic material is itself electrically conducting, then they provide an alternate electrical path to that offered by the adjacent loops. The current thus generated are referred to as eddy currents; these are believed to be the primary source of the losses experienced in prior-art transformer schemes. Since the magnetic field is in a direction curling around the conductors, there is no need for magnetic continuity in the direction of the loop.

In the preferred embodiment illustrated in FIGS. 3 and 9, there is located within the recess 25 a magnetically conducting, electrically insulating (MCEI) element 27. As can best be seen in the cross section in FIG. 9, the MCEI element 27 includes a U-shaped trough 29 with a bottom 55, a first side 57 and a second side 59, thus forming an opening between the two sides. The dimensions of the MCEI element 27 trough 29 can be varied based on the following factors. First, the MCEI must be sized to fit within the recess 25. In addition, as will be discussed in detail below, the height and width of the trough should be selected to optimize the magnetically conducting properties of the MCEI.

One property of the MCEI element is that it is magnetically conducting. One measure of this property is referred to as the magnetic permeability discussed above. In general, the magnetically conducting components should have a magnetic permeability greater than air. Materials having too high of a magnetic permeability tend to have hysteresis losses associated with reversal of the magnetic domains themselves. Accordingly, a material is desired having a permeability sufficiently high to keep the field out of the steel and yet sufficiently low to minimize losses due to magnetic hysteresis. Preferably, the magnetic permeability of the MCEI element should be greater than that of steel, which is typically about 40 times that of air, more preferably greater than about 100 times that of air. Preferably, the magnetic permeability is less than about 2,000. More preferably, the MCEI element has a magnetic permeability les than about 800. Most preferably, the MCEI element has a magnetic permeability of about 125.

In order to avoid or reduce the eddy currents discussed above, the MCEI is preferably electrically insulating as well as magnetically conductive. Preferably, the MCEI element has an electrical resistivity greater than that of steel, which is typically about 12 micro-ohm cm. Most preferably, the MCEI has an electrical resistivity greater than about one million ohm-cm.

The MCEI element 27 is preferably made from a single material, which in and of itself has the properties of being magnetically conductive and electrically insulating. A particularly preferred material is ferrite. Ferrite is described in the on-line edition of the Encyclopedia Britannica as "a ceramic-like material with magnetic properties that are useful in many types of electronic devices. Ferrites are hard, brittle, iron-containing, and generally gray or black and are polycrystalline—i.e., made up of a large number of small crystals. They are composed of iron oxide and one or more other metals in chemical combination." The article on ferrite goes on to say that a "ferrite is formed by the reaction of ferric oxide (iron oxide or rust) with any of a number of other metals, including magnesium, aluminum, barium, manganese, copper, nickel, cobalt, or even iron itself." Finally, the article states that the "most important properties of ferrites include high magnetic permeability and high electrical resistance." Consequently, some form of ferrite is ideal for the MCEI element in the present invention. Most preferably, the ferrite is one commercially available from Fair-Rite Products Corp., Wallkill, N.Y., grade 61, having a magnetic permeability of about 125. There are a number of other manufacturers that provide commercial products having a corresponding grade and permeability albeit under different designations.

As an alternative to using a single material that is both magnetically conductive and electrically insulating, the MCEI element can be made from a combination of materials selected and configured to give these properties to the element as a whole. For example, the element can be made from a matrix of particles of one material that is magnetically conductive and particles of another material that is electrically insulating, wherein the matrix is designed so as to prevent the conduction of electrical currents, while promoting the conduction of a magnetic current. One such material, composed of ferromagnetic metal particles molded in a polymer matrix, is known in the art as "powdered iron." Also, instead of a matrix, the MCEI element may be formed from laminations of a materials such as a silicon transformer steel separated by an electrically insulating material, such as a ceramic, mineral (mica), or a polymer. Because the induced electric field is always perpendicular to the magnetic field, the chief requirement for the MCEI element is that the magnetic field be accommodated in a direction that wraps around the coil, whereas electrical conduction should be blocked in the circumferential direction, perpendicular to the magnetic field and parallel to the coil.

In accordance with one embodiment of the present invention, the MCEI is formed from a single piece of ferrite of other piece of MCEI material. This can be accomplished by molding, sintering, or machining the ferrite to the desired shape and size. FIGS. 10 and 11 show such an embodiment. As can be seen, it is preferable to leave a small gap 101 in the MCEI element 27 to accommodate insertion of the input leads to the coil 63.

In a more preferred embodiment shown in FIG. 13, the MCEI element 121 is formed from several segments of ferrite 133 which are held together in the appropriate configuration by means of a resilient material, such as an epoxy, a natural rubber, a fiberglass or carbon fiber composite, or a polyurethane. Preferably, the resilient material both forms a base 125 for the element and also fills the gaps 137 between the segments of MCEI material. In this way, the overall strength and toughness of the MCEI element 121 is improved. A preferred method of forming a segmented MCEI element 121 begins with providing a mold having a generally u-shaped trough conforming to the final dimensions of the MCEI element. A two-part, heat-curable epoxy formulation is mixed in a centrifuge cup, to which the individual ferrite segments and a length of fiberglass rope are added. The parts are centrifuged for up to 30 minutes to cause all bubbles induced by mixing to rise out of the viscous liquid, and to cause the liquid to penetrate and seal any porosity in the ferrite. The fiberglass rope is then laid in the bottom of the mold, which is either made from a material which does not bond to epoxy, such as polymerized tetrafluroethane or which is coated with a mold release agent. The individual u-shaped ferrite segments are then placed on top of the fiberglass rope, to fill the circle, except for the gap or hole 101 of FIGS. 10 and 13. Any excess epoxy is wiped out of the u-shaped groove. The upper surfaces of the parts can be precisely aligned with each other by holding them in position with magnets placed around the u-shaped trough in the mold. After the epoxy is cured, either at room temperature or in an oven, the tough flexible ferrite assembly is removed from the mold.

As seen in FIGS. 3 and 9, the MCEI element is preferably fit within the recess 25. Most preferably, a resilient material 61, such as polyurethane, is disposed between the MCEI element 27 and the steel surface of the recess 25. This resilient material 61 is used to hold the MCEI element 27 in place. In addition, the resilient material 61 forms a transition layer between the MCEI element and the steel which protects the element from some of the forces seen by the steel during joint makeup and drilling. Preferably, the resilient material is a flexible polymer, most preferably a two-part, heat-curable, aircraft grade urethane, such as grade 1547, manufactured by PRC Desoto International, Glendale, Calif. It is important that the resilient material 61 will withstand the elevated pressures and temperatures in downhole conditions. Consequently, it is preferred to treat the material to make sure that it does not contain any voids or air pockets. Preferably the resilient material is centrifuged to remove all bubbles that might be introduced during mixing. One such treatment method involves subjecting the material in a centrifuge. A most preferred form of this method subjects the material to a centrifuge at between 2500 to 5000 rpm for about 0.5 to 3 minutes. Lying within the trough of the MCEI element 27 is an electrically conductive coil 63. This coil is preferably made from at least one loop of an insulated wire, most preferably only a single loop. The wire is preferably made of copper and insulated with varnish, enamel, or a polymer. Most preferably, the wire is insulated with a tough, flexible polymer such as high density polyethylene or polymerized tetrafluoroethane (PTFE). The diameter of the wire, with insulation, is preferably selected so as to be slightly less than the width of the U-shaped trough in the MCEI element. As will be discussed below, the specific properties of the wire and the number of loops is important in providing a proper impedance for the coil 63.

For a given application, the transformer diameter is fixed by the diameter of the pipe. The impedance of the transformer, and its desired operating frequency, can be adjusted by two factors: the number of turns in the conductor and the ratio of length to area of the magnetic path, which curls around the conductors. Increasing the number of turns decreases the operating frequency and increases the impedance. Lengthening the magnetic path, or making it narrower, also decreases the operating frequency and increases the impedance. This is accomplished by increasing the depth of the U-shaped trough or by decreasing the thickness of the side-walls. Adjusting the number of turns gives a large increment, while adjusting the dimensions of the trough enables small increments. Accordingly, the invention allows the impedance of the transformer portion of the transmission line to be precisely matched to that of the conductor portion, which is typically in the range of 30 to 120 ohms. Although an insulated copper wire is preferred, other electrically conductive materials, such as silver or copper coated steel, can be used to form the coil 63.

As can be seen in FIG. 12, the coil 63 is preferably embedded within a material 65, which material fills the space within the trough of the MCEI element 27. Naturally, this material 65 should be electrically insulating. It is also preferable that this material 65 is resilient so as to add further toughness to the MCEI element. The preferred material to use for this purpose is a two-part epoxy formulation, preferably one filled with a powdered material such as fumed silica or fine aluminum oxide to provide abrasion resistance. The applicants have used standard commercial grade epoxy combined with a ceramic filler material, such as aluminum oxide, in proportions of about 50/50 percent. Other proportions may be desirable, but the filler material should not be less than 3 percent nor greater than 90 percent in order to achieve suitable abrasion resistance as well as adequate adhesiveness. Alternatively, other materials, such as room-temperature curable urethanes, are used. As with the resilient material 63, it is important that the material 65 be able to withstand the extreme conditions found downhole. Consequently, it is important to treat the material in such a way as to ensure the absence of voids or air pockets. The centrifugal treatment for material 63 can be used for material 65 as well.

As can be seen in FIGS. 4, 5 and 6, the box end 15 also includes a recess 45 similar to the recess 25 in the pin end, except that the recess 45 is formed in the internal, secondary shoulder 33 of the box end. A MCEI element 47, similar in all respects to the MCEI element 27, is located within the recess 45. A coil 49, similar in all respects to the coil 63, is located within the trough of the MCEI element 47 and embedded within material 48.

As can be seen in FIG. 6, when the pin and box end are joined, the MCEI element 27 of the pin end and the MCEI element 47 of the box end are brought to at least close proximity. Preferably, the elements 27 and 47 are within about 0.5 mm of each other, more preferably within about 0.25 mm of each other. Most preferably, the elements 27 and 47 are in contact with each other.

Because the faces 23 and 33 of the pin and box end may need to be machined in the field after extended use, it may preferred to design the troughs in the pin and box end with a shape and size so as to allow the first and second conductive coils to lie in the bottom of the respective troughs and still be separated a distance from the top of the respective first and second sides. As a result, the faces 23 and 33 can be machined without damaging the coils lying at the bottom of the troughs. In this embodiment, this distance is preferably at least about 0.01 inches, more preferably, this distance is at least about 0.06 inches.

An electrical conductor 67 is attached to the coil 63, in FIGS. 3, 9, 5, 5A, 6, 7, and 8. At present, the preferred electrical conductor is a coaxial cable, preferably with a characteristic impedance in the range of about 30 to about 120 ohms, most preferably with a characteristic impedance in the range of 50 to 75 ohms Because the attenuation of coaxial cable decreases with increasing diameter, the largest diameter compatible with installation in pipe chosen for a particular application should be used. Most preferably the cable has a diameter of about 0.25" or larger. Preferably the shield should provide close to 100% coverage, and the core insulation should be made of a fully-dense polymer having low dielectric loss, most preferably from the family of polytetrafluoroethylene (PTFE) resins, Dupont"s Teflon® being one example. The insulating material surrounding the shield should have high temperature resistance, high resistance to brine and chemicals used in drilling muds. PTFE is preferred, or most preferably a linear aromatic, semi-crystalline, polyetheretherketone thermoplastic polymer manufactured by Victrex PLC under the trademark PEEK®. A typical supplier for such material is Zeus Products, Orangeburg, S.C.

Alternatively, the conductor can be a twisted pair of wires, although twisted pair generally suffers from higher attenuation than coaxial cable. Twisted pair generally has a characteristic impedance of about 120 ohms, which would provide a desired matching impedance to certain coil configurations. In addition, for certain configurations of drill pipe, there may be limited room at either end of the pipe for a large-diameter coaxial cable. In this case, a short length of twisted pair might provide a small-diameter transition between the coils at the ends of the pipe and a larger-diameter coaxial cable that runs most of the length of the pipe. For lengths of a few feet, the higher attenuation of twisted pair, and its mismatch of impedance to the coaxial cable are of little consequence. However, if desired, the impedance of the twisted pair can be matched to that of the coaxial cable with a small transmission line transformer (balun).

Although the pipe itself could be used as one leg of the current loop, coaxial cable is preferred, and most preferably the conductor loop is completely sealed and insulated from the pipe. It is preferable to select the electrical properties of the conductor so as to match the impedance of the coils to which it is attached. Preferably, the ratio of the impedance of the electrical conductor to the impedance of the first and second electrically conductive coils is between about 1:2 and 2:1. Most preferably, it is close to 1:1.

The preferred data transmission system provides a relatively broad bandwidth. While not wishing to be bound by any particular theory, it is currently believed that this is accomplished by the low number of turns of conductor and the low reluctance of the magnetic path, thus producing a surprisingly low mutual inductance for such a large diameter coil. For a two-turn coil with a 4.75-inch diameter, the mutual inductance of the assembled toroid is about 1 micro Henry. With a 50 ohm resistive load, peak signal transmission is at about 4 MHz, and at power transmission extends from about 1 MHz to about 12 MHz. The inductive reactance is about 65 ohms, and the attenuation is only about 0.35 dB per joint, equivalent to power transmission of about 92 percent. As adjacent segments are assembled, a serial filter is created, which has the effect of reducing the bandwidth. If each individual transformer had a narrow bandwidth, the band-pass of the filter would change as additional segments are added, which would require that each individual element be separately tuned according to its position in the system. Nevertheless, a surprising feature of the invention is that identical segments can be assembled in any arbitrary number of joints while still enabling efficient signal coupling. The 30-joint test described below gave a total attenuation of 37.5 dB (0.018% power transmission), of which 70% was in the coaxial cable itself, which was chosen to have a shield diameter of 0.047 inches. Maximum power transmission was at 4.2 MHz and the bandwidth, at half power, of 2 MHz. Thus a six volt, 90 milliwatt signal resulted in a detected signal, after 30 joints, of 80 mV.

Figure 20A:
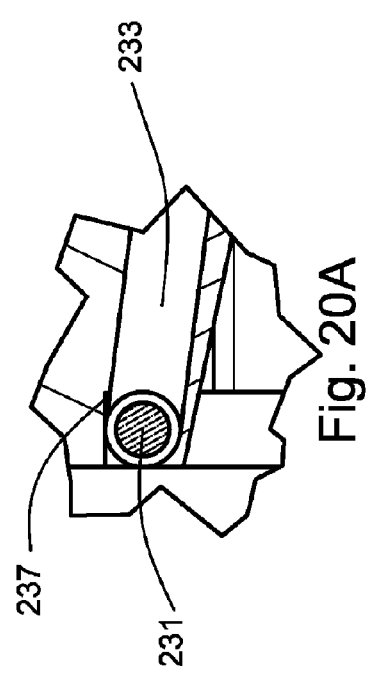
FIGS. 20 and 20a are are cross-sectional views of an alternative embodiment that does not use MCEI elements.
Figure 20:
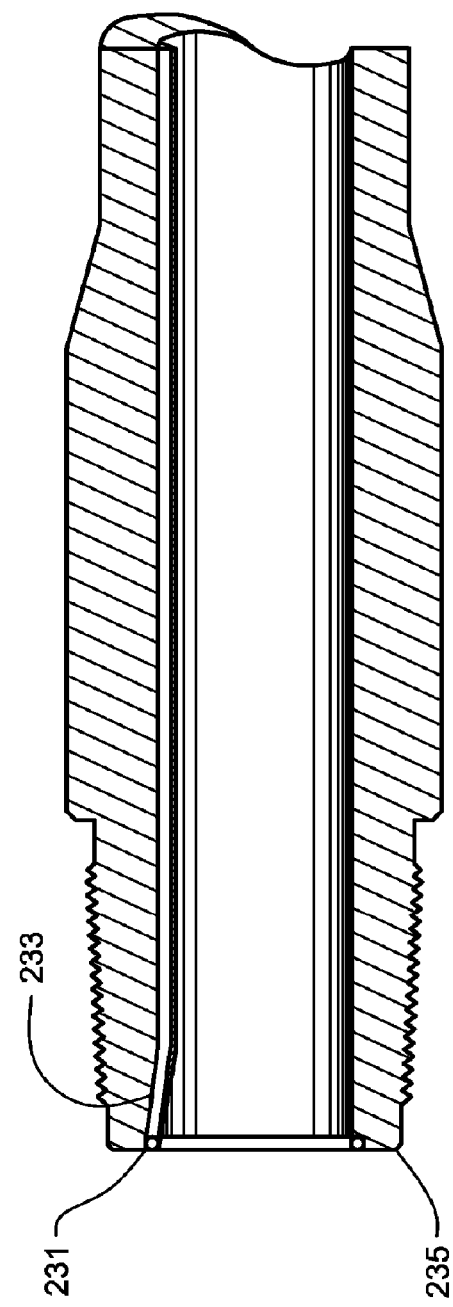

Although possible problems relating to attenuation make it preferable to use an MCEI element in the system of the present invention, the inventors have found that using a coil having five turns or less can still produce a system with sufficient bandwidth to be useful. More preferably, such a system has 2 turns, and most preferably only a single turn 231. This alternative embodiment is shown in FIGS. 20 and 20A. As can be seen, a single turn of a conductor 231 is placed within a recess 237 in the internal face 235 of the pin end. The coil 231 is connected to a conductor 233, which is in turn connected to a coil (not shown) in the box end of the downhole component.

It is preferred in the alternative embodiment in FIGS. 20 and 20A, to insure that the frequency is sufficiently high, i.e. above about 5 MHz and sufficiently wide bandwidth (about 2 MHz). This system is useable with about 10 downhole components in series.

Turning again to the preferred embodiment, and as shown in FIGS. 3, 5, 5A, 6, 7, and 9, it is preferred that the wire of the coil 63 extends through the MCEI element 27 to meet the electrical conductor 67 at a point behind the MCEI element. Also, referring to FIG. 9, the electrical conductor 67 and the wire of the coil 63 preferably meet in a passage 69 formed in the pin end. Likewise, referring to FIG. 5A, the electrical conductor 67 and the wire of the coil 49 meet in a passage 70 formed in the box end. The passages 69 and 70 are holes, preferably drilled from one point in the bottom of the recess 25 and 45, respectively, through the enlarged wall of the pin end and box end, respectively, so that the holes open into the central bore of the pipe section 11. The diameter of the hole will be determined by the thickness available in the particular joint. For reasons of structural integrity it is preferably less than about one half of the wall thickness. Preferably, these holes have a diameter of about between 3 and 7 mm.

These two holes can be drilled by conventional means. Preferably, they are drilled by a technique known as gun drilling. Preferably, the recesses can be machined and the holes can be drilled in the field, so as to allow for retrofitting of existing drill pipe sections with the data transmission system of the present invention in the field.

As can be seen in FIGS. 3 and 5, the electrical conductor 67 is protected within the holes 69 and 70 respectively. Nevertheless, after the conductor 67 is placed within these holes, it is preferable to add a sealing material such as urethane. As with all other materials used in the system of the present invention, it is important to select materials and prepare them so as to be able to withstand the extreme conditions of the downhole environment.

Figure 15:
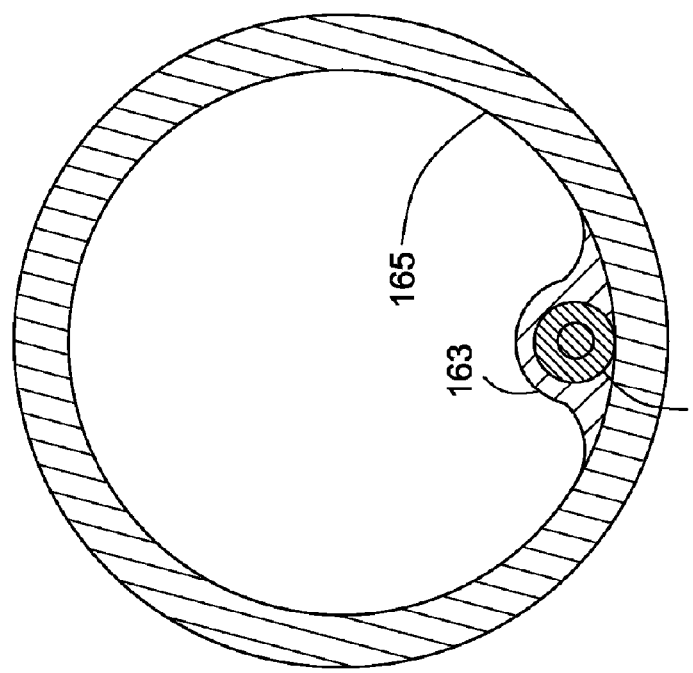
FIG. 15 is a cross-sectional view along line 15—15 of FIG. 1.

After exiting the holes 69 and 70, the electrical conductor passes through the interior of the body of the pipe section. Accordingly, it is important to provide the electrical conductor with insulation that can withstand the harsh conditions as well. At present, the preferred material with which to insulate the conductor 67 is PEEK®. As shown in FIG. 15, this material is preferably purchased in a hollow tube 161 with an inside diameter of slightly larger than the outside diameter of the electrical conductor 67 and an outside diameter large enough to accommodate insertion of the tube into holes 69 and 70. These dimensions will vary depending upon the size of the pipe and the cable being protected.

In addition to the protection provided by an insulator like the tube of PEEK® described above, it is also preferable to apply a coating to add further protection for the electrical conductor 67. Referring to FIG. 15, the coating 163 is applied to the interior 165 of the drill pipe section 11 with the conductor 67 lying on the bottom. As a result, the coating 163 flows under the influence of gravity to coat the tube 161. The coating should have good adhesion to both the steel of the pipe and the insulating material surrounding the conductor. Preferably, the coating is a polymeric material selected from the group consisting of natural or synthetic rubbers, epoxies, or urethanes. Preferably, it should be in a cast-able form, so that it can settle by gravity around the cable. The coating can be any suitable material such as the polyurethane previously described. The amount of coating to apply can be varied, but preferably it should be applied in a thickness at least equal to that of the insulating material surrounding the shield of the coax. Most preferably, the material is poured so as to flow by gravity to cover the conductor cable. Preferably, between about one to 5 liters are used for each 30 foot pipe section. The urethane may be either air dried or heat cured by installing a heating element along the inside bore of the pipe. Curing times and temperatures will vary depending on manufacturing expediencies. At present, the preferred method of attaching the conductor 67 to the coils 63 and 49 is soldering to form a continuous loop wire harness prior to installation into the pipe. One or more coils may then be formed at the ends of the loop without breaking into the wire harness. Although a lead/tin solder might be used, a silver solder is preferred, because of its higher melt temperature, greater mechanical strength, and greater resistance to chemical corrosion. The inner core of the coaxial cable is soldered to one end of the coil, and the outer shield to the other. Any exposed conducting surfaces should be potted with an insulating material, such as silicone rubber, epoxy, or urethane, so that the entire wire harness is insulated electrically from the environment prior to placing it in the pipe.

Figure 17:
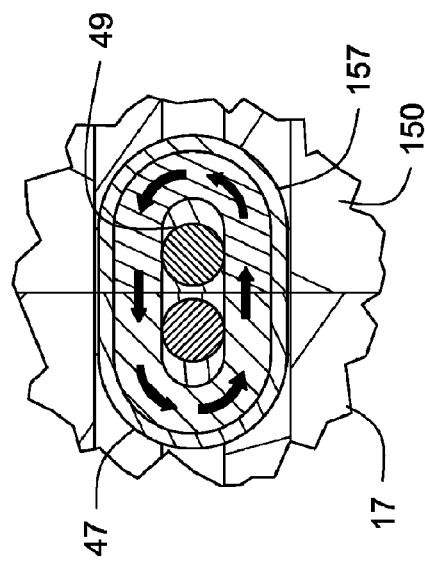
FIG. 17 is an enlarged cross-section of a connection between MCEI elements of a connected pin and box end.
Figure 16:
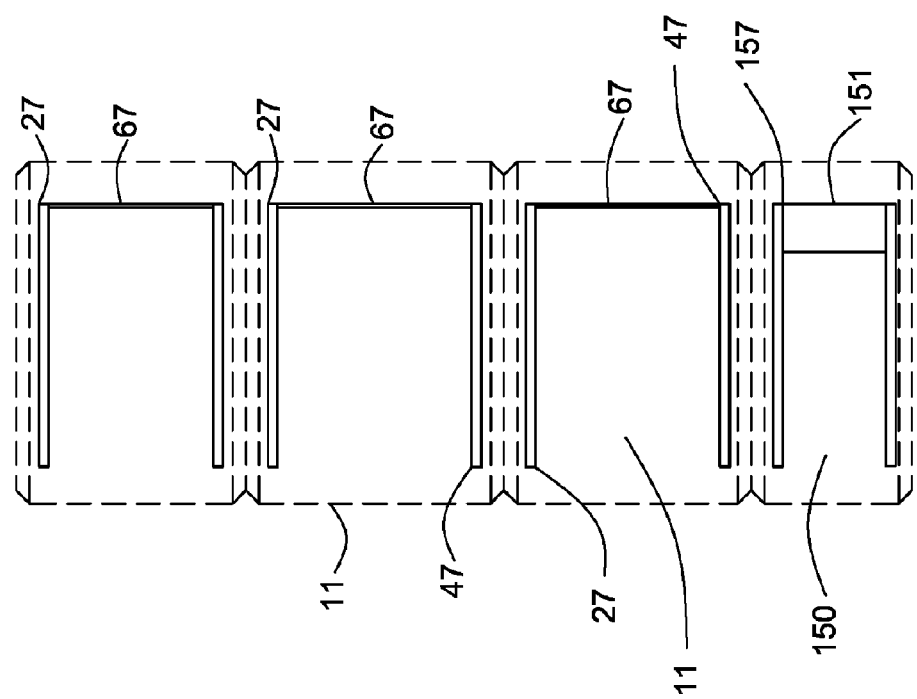
FIG. 16 is a schematic diagram of the electrical and magnetic components of the data transmission system of the present invention.

FIG. 16 is a schematic diagram to illustrate the operation of the data transmission system of the present invention. A drilling tool 150 has housed within it a data source. The data source is designed to encode information on a high frequency alternating carrier signal on the electrical conductor 151. The conductor 151 is connected to the coils (not shown) within the MCEI element 157 at one end of the tool 150. The alternating current within the coil induces an alternating magnetic field within the MCEI element 157. That magnetic field is conducted across the joint and into the MCEI element 47 in the box end of a section of drill pipe 11. Referring to the joint in FIG. 17, the two generally U-shaped elements 47 and 157 form a closed path for the magnetic flux, which circulates as shown by the arrows. The arrows reverse direction every time the current in the coils reverse direction. The magnetic field in the MCEI element 47 induces an electric current in the coil 49. The electric current induced in the coil 49 travels along the conductor 67 to the coil located in the MCEI element 27 at the pin end of the drill pipe 11, and so on.

FIG. 18 shows a drill bit 181 connected to a data and crossover sub 183. The sub 183 is typically connected to the pin end of a section of drill pipe or some other downhole component. The sub 183 includes within it a data sensor module 185. In the depicted embodiment, the data sensor module 185 includes an accelerometer 195. The accelerometer is useful in gathering real time data from the bottom of the hole. For example, the accelerometer can give a quantitative measure of bit vibration.

Figure 19:
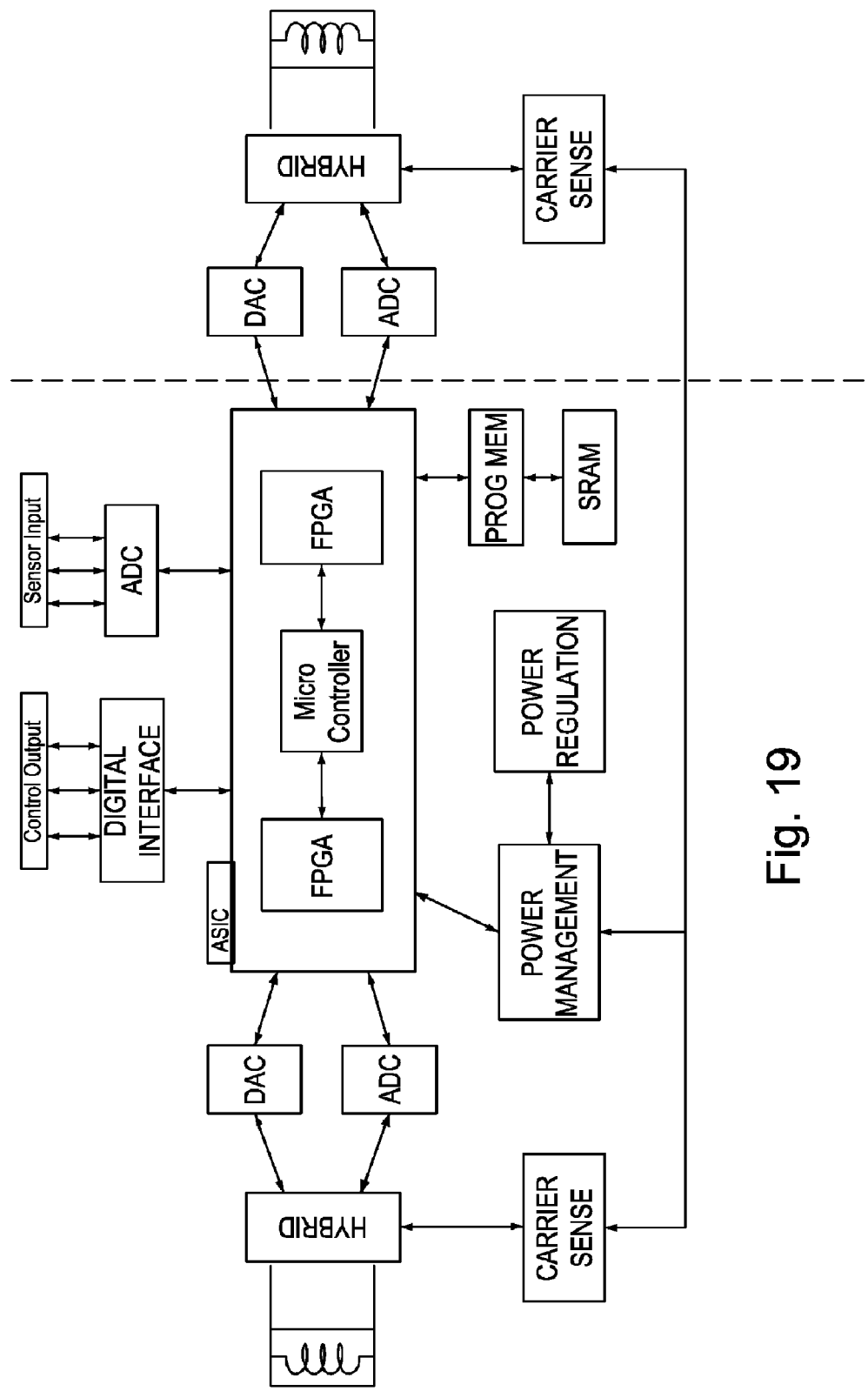
FIG. 19 is a circuit diagram of the of the sensor module shown in FIG. 18.

The accelerometer 195 is connected to a circuit board 197, which generates a carrier signal and modulates it with the signal from the accelerometer. FIG. 19 is a circuit diagram of the board 197.

The circuit board 197 is connected through conductor 199 to a coil in the MCEI element 187 at the bit end of the sub. It then communicates through MCEI element 189, conductor element 191, and MCEI element 193, to the opposite end of the sub, which is adapted to connect to corresponding elements in the drill string. As such, the sub 183 is adapted to communicate with the pin end of a section of drill pipe or some other downhole component.

Many other types of data sources are important to management of a drilling operation. These include parameters such as hole temperature and pressure, salinity and pH of the drilling mud, magnetic declination and horizontal declination of the bottom-hole assembly, seismic look-ahead information about the surrounding formation, electrical resistivity of the formation, pore pressure of the formation, gamma ray characterization of the formation, and so forth. The high data rate provided by the present invention provides the opportunity for better use of this type of data and for the development of gathering and use of other types of data not presently available.

Preferably, the system will transmit data at a rate of at least 100 bits/second, more preferably, at least 20,000 bits/second, and most preferably, at least about 1,000,000 bits/second.

An advantage of the present invention is that it requires relatively low power and has a relatively high preservation of signal. Thus, the system preferably transmits data through at least 10 components powered only by the varying current supplied to one of the first conductive soils in one of the components. More preferably, the system transmits data through at least 20 components powered only by the varying current supplied to one of the first conductive coils in one of the components.

Preferably, the varying current supplied to the first conductive coil in the one component is driving a varying potential having a peak to peak value of between about 10 mV and about 20 V. Preferably, the current loss between two connected components is less than about 5 percent. Put another way, it is preferred that the power loss between two connected components is less than about 15 percent.

It is anticipated that the transmission line of the invention will typically transmit the information signal a distance of 1,000 to 2,000 feet before the signal is attenuated to the point where it will require amplification. This distance can be increased by sending a stronger signal, with attendant increased power consumption. However, many wells are drilled to depths of up to 20,000 to 30,000 feet, which would necessitate use of repeaters to refurbish the signal. Preferably, the amplifying units are provided in no more than 10 percent of the components in the string of downhole components, more preferably, no more than 5 percent.

In the most preferred embodiment of the invention, any source of information along the drill string, such as the bit sub illustrated in FIG. 18, or a repeater, as described in the previous paragraph, may constitute an addressable node in a Drilling Local Area Network (DLAN). Preferably every repeater and every data sub manufactured in the world will be identified with a unique address. This address might be characterized by programming a programmable memory chip in the tool with a code having a sufficient number of bits to encompass all tools that might ever be connected to any DLAN comprising the transmission line of the present invention. This will allow tracking of licensed elements and will also allow manufacturers of down-hole tools to track the usage of their tools. To reduce network overhead, each tool, once assembled into a drill string, might be identified by a temporary address comprising fewer bits; for instance, a two-byte address (16 bits) will cover up to 256 nodes probably sufficient for any drilling task. Aspects of any of the known network protocols, such as "Ethernet" or "Wireless Local Area Network" might be applied to such a DLAN. For example, the network might be thought of as a single "party line" shared by all participating nodes.

Although the invention provides a sufficiently broad-band signal to allow simultaneous transmission of information in each direction (full duplex), it is anticipated, because of the attenuation characteristics of the invention, that the most efficient communication will be half duplex, with a signal being sent from one end of the network to the other in one direction before a signal is sent in the opposite direction (half duplex). Alternatively, an asynchronous transmission line might be set up, with, for instance, 80% of the bandwidth reserved for upstream data and 20% for downstream commands. A control computer at the surface will relay a command down-hole requesting that an identified node send a packet of information. Each repeater examines the identifying header in the command packet. If the header matches its own address, it responds; otherwise, it simply relays the packet on down the network in the same direction. In this manner, many smart nodes can share a common transmission line. Any known scheme for collision detection or avoidance may be used to optimize access to the transmission medium.

Other types of data sources for downhole applications are inclinometers, thermocouples, gamma ray detectors, acoustic wave detectors, neutron sensors, pressure transducers, potentiometers, and strain gages.

Communications on the network are made pursuant to a network protocol. Examples of some commercial protocols are ATM, TCP/IP, Token Ring, and Ethernet. The efficiencies of the present system may require a novel protocol as well. A protocol is an established rule on what the data frame is comprised of. The data frame usually includes a frame header, a datagram, and a CRC. The body of the frame may vary depending on what type of datagram is in use, such as an IP datagram. The end of the frame is a CRC code used for error correction. The IP datagram consists of a header and IP datagram data. In an open system, more than one type of datagram is transported over the same communications channel. The header is further broken down into other information such as header information, source IP address and destination IP address, required by the protocol so that each node knows the origin and destination of each data frame. In this manner the downhole network will allow each node to communicate with the sensors and the surface equipment in order to optimize drilling parameters.

Although the primary purpose of the invention is for relaying of information, a limited amount of power can be transmitted along the transmission line. For instance, it may be desirable to have a second class of nodes distributed at intervals between the primary repeaters. The primary repeaters will be powered by batteries or by a device, such as a turbine, which extracts energy from the mud stream. The secondary nodes may incorporate low power circuits to provide local information of secondary importance, using energy from the transmission line itself. They would not constitute repeaters, since they would be in parallel with the existing transmission line. These secondary nodes may, for instance, tap a small amount of energy from the line to keep a capacitor or battery charged, so that when they are queried from the top at infrequent intervals they can send a brief packet of information at full signal strength. Using this principle, it might be possible to house a small low-power secondary node in every section of drill pipe, thereby providing a continuously distributed DLAN.

EXAMPLES

The following examples are provided by way of illustration and explanation and as such are not to be viewed as limiting the scope of the present invention.

Bench Test. Bench tests stimulating connected pipe joints were conducted. The tests incorporated 30 sets of inductively coupled joints incorporating flexible segmented ferrite MCEI units in steel rings with recesses machined therein, each set being joined together in series by 34 feet of coaxial cable. The coupler consisted of 0.25-inch long by 0.100-inch diameter ferrite cylinders of permeability 125, having an inside diameter of about 0.05 inches, which were ground in half parallel to the cylindrical axis after infiltration with epoxy, bonding to a nylon chord substrate, and bonding into the groove in the steel. This simulated joint was used to characterize system transmission. A 2-volt peak-to-peak sinusoidal signal from a single 50-ohm, 2.5-mW power source energized the coupler of the first joint and produced a 22 mV, signal at last joint, into a 50 ohm load. Peak signal transmission was at 4.3 MHz, with a band width, at half height, of 2 MHz, The average attenuation in each pipe segment was about 1.2 dB, corresponding to about 78% power transmission. About 70% of the attenuation was in the coaxial cable, which had a relatively small shield diameter (0.047 inches). The carrier signal was modulated with both analog and digital signals, demonstrating that that a recoverable, low power, high frequency, 56 kilobaud signal is achievable across 1000 feet of interconnected drill pipe without the aid of an additional power boost or signal restoration.

Drilling test. XT57 tool joints, one a pin end and the other a box-end, were obtained from Grant Prideco, Houston, Tex. The joints had an outside diameter of approximately 7" and an inside diameter of 4.750 inches, and they were adapted to receive the coupling transducer by machining an annular groove measuring 0.125"×0.200" deep, having a full radius bottom surface of 0.060", approximately in the center of the 0.550" wide external and internal secondary shoulders, respectively, of the pin and box ends. 0.500" internal shoulder was also machined into the pin-end joint approximately 9 inches from the end opposite its secondary shoulder. The machining increased a portion of the internal diameter of the pin end to about 5.250". A 0.375 inches borehole was gun drilled through the sidewalls of the two joints, parallel to their longitudinal axis. In the pin end, the borehole commenced within the groove and exited the internal shoulder. In the box end, the borehole commenced within the groove and exited the opposite end of the joint. The two joints were welded together, simulating a full-length pipe that normally would be more than 30 feet long. The change in the internal diameter of the welded joints allowed for positioning 30 feet of coaxial cable within the joint so that the test would electrically equivalent to a fullength section of pipe.

The coupling transducer, having a nominal diameter of 4.700", comprising a grade 61 ferrite, with a permeability of about 125, obtained from Fair-Rite, was disposed within the annular grooves. The core of the coupler consisted of a segmented annular ferrite ring measuring approximately 0.100" wide by 0.050" high having a 0.050-inch diameter groove centrally located on its exposed face. The ferrite segments were attached to a substrate consisting of an epoxy impregnated nylon cord that served as a backing for the ferrite during the manufacturing process. A coil having two loops of 22-gauge (0.025 inch diameter), enamel coated copper magnet wire, was wound within the ferrite groove and held in place with aircraft epoxy. The wire and ferrite assembly were affixed within the grooves in the steel using a thermally cured polyurethane resin. The ends of the copper wire were allowed to extend approximately 0.5 inches beyond the coupler apparatus and were soldered to the conductors of a type 1674A, coaxial cable, 34 feet long, having a characteristic impedance 50 ohms, obtained from Beldon Cable. The cable was protectively sheathed within a thermoplastic PEEK® material obtained from Zeus Products, and the length of the cable was coiled within the hollow portion of the joint assembly and held in place with a polyvinyl chloride (PVC) sleeve.

A drilling test was conducted in a 100 foot well using thirty physically short, electronically full-length joints configured as described above. A seven-inch roller-cone bit sub from Reed Tool was fitted with an accelerometer, an FM modulator, and a battery power supply, which were sealed in a annular insert housed within the crossover sub connecting the drill string with the bit. The joints were assembled so that their respective transducers were concentrically aligned to within approximately 0.010" of each other. In the test the drill bit drilled a cement plug with and without the aid of a drilling fluid. A 6V peak-to-peak sinusoidal signal (90 mW into 50 ohm) at the bit sub gave a clean 80 mV PP signal (50 ohm load) at the surface, which was 32 inductive couples and approximately 1000 electrical feet above the source signal. The two extra inductive pairs comprised a pair at the accelerometer sub and a rotary pair at the top drive. The audible portion of the accelerometer signal (below 20 kHz) produced an audio signal that enabled the ear to discriminate mud turbulence from drilling activity.

We claim:

1. A plurality of drill pipes, each drill pipe comprising;
   a first inductive coupler comprising and Archimedean coil inserted in a non-electrically conductive core, detachably assembled within a first groove in a first end of the drill pipe, and a second inductive coupler comprising a second Archimedean coil inserted in a second non-electrically conductive core, detachably assembled within a second groove in a second end of the drill pipe, the first and second inductive couplers in electrical communication;
   wherein the first inductive coupler at the first end of one of the plurality of drill pipes is cooperatively arranged to be in magnetic, but not in electrical communication with the second inductive coupler at the second end of another of the plurality of drill pipes.

2. The plurality of drill pipes of claim 1 wherein at least one of the Archimedean coils comprises a planar or radial Archimedean coil.

3. The plurality of drill pipes of claim 1 wherein at least one of the Archimedean coils is an axially wound coil.

4. The plurality of drill pipes of claim 1 wherein electrical communication is accomplished by an insulated wire or a coaxial cable.

5. The plurality of drill pipes of claim 1 wherein the inductive couplers are sealed from contamination.

6. The plurality of drill pipes of claim 1 wherein the inductive couplers are capable of transmitting and receiving a carrier signal across three or more of the plurality of drill pipes without a boost from of an additional power source or repeater.

7. The plurality of drill pipes of claim 1 wherein the inductive couplers are powered by a remote low wattage power source of less than 1.0 watts and more than 0.001 watts.

8. The plurality of drill pipes of claim 7 wherein the low wattage power source comprises batteries or a downhole generator.

9. The plurality of drill pipes of claim 1 wherein the inductive couplers operate with a high frequency carrier signal of between 1 megahertz and 10 megahertz.

10. The plurality of drill pipes of claim 1 wherein when the inductive couplers are made up with the drill pipes such that upon assembly the inductive couplers are within 1.0 inches of each other.

11. The plurality of drill pipes of claim 10 wherein the inductive couplers contact one another.

12. The plurality of drill pipes of claim 1 wherein the first and second Archimedean coils each produced an electromagnetic field, and wherein each coil comprises at least a single turn or loop of electrically conductive material.

13. The plurality of drill pipes of claim 12 wherein the electromagnetic field is produced by annular traces printed onto a circuit board.

14. The plurality of drill pipes of claim 12 wherein each Archimedean coil further comprises of a core for reducing eddy currents in the drill pipes and for focusing the electromagnetic field toward the electromagnetic field of the adjacent coupler.

15. The plurality of drill pipes of claim 14 wherein the core comprises a material selected from the group consisting of ferrous metals, iron, powdered irons, ferrites, ceramics, and combinations thereof.

16. The plurality of drill pipes of claim 14 wherein the core further comprises a laminated or tape wound core.

17. A plurality of remotely powered inductive couplers for use across a plurality of joints, each joint comprising:
a tube with first and second ends, a first one of the plurality of inductive couplers comprising a first Archimedean coil inserted in a non-electrically conductive core and detachably assembled within a first groove in the first end of the tube, and a second one of the plurality of inductive couplers inductive couplers comprising a second Archimedean coil inserted in a second non-electrically conductive core and detachably assembled within a second groove in the second end of the tube, the first and second ones of the plurality of inductive couplers in electrical communication;
wherein the first one of the plurality of inductive couplers at the first end of one of said joints is cooperatively arranged to be in magnetic, but not in electrical communication with the second one of the plurality of inductive couplers at the second end of another of said joints.

18. The plurality of remotely powered inductive couplers of claim 17 wherein at lest one of the Archimedean coils comprises a planar or radial Archimedean coil.

19. The plurality of remotely powered inductive couplers of claim 17 wherein at least one of the Archimedean coils is an axially wound coil.

20. The plurality of remotely powered inductive couplers of claim 17 wherein electrical communication is accomplished by an insulated wire or a coaxial cable.

21. The plurality of remotely powered inductive couplers of claim 17 wherein the inductive couplers operate with a high frequency carrier signal of between 1 megahertz and 10 megahertz.

22. The plurality of remotely powered inductive couplers of claim 17 wherein when the inductive couplers are made up with the drill pipes such that upon assembly the inductive couplers are within 1.0 inches of each other.

23. The plurality of remotely powered inductive couplers of claim 17 wherein the inductive couplers are sealed from contamination.

24. The plurality of remotely powered inductive couplers of claim 17 wherein the inductive couplers are capable of transmitting and receiving a carrier signal across three or more joints of the plurality of joints without a boost from of an additional power source or repeater.

25. The plurality of remotely powered inductive couplers of claim 17 wherein the inductive couplers are powered by a remote low wattage power source of less than 1.0 watts and more than 0.001 watts.

26. The plurality of remotely powered inductive couplers of claim 25 wherein the low wattage power source comprises batteries or a downhole generator.

27. The plurality of remotely powered inductive couplers of claim 17 wherein the first and second Archimedean coils each produce an electromagnetic field, and wherein the coil comprises at least a single turn or loop of electrically conductive material.

28. The plurality of remotely powered inductive couplers of claim 27 wherein the electromagnetic field is produced by annular traces printed onto a circuit board.

29. The plurality of remotely powered inductive couplers of claim 27 wherein the inductive couplers contact one another.

30. The plurality of remotely powered inductive couplers of claim 27 wherein each Archimedean coil further comprises of a core for reducing eddy currents in the drill pipes and for focusing the electromagnetic field toward the electromagnetic field of the adjacent coupler.

31. The plurality of remotely powered inductive couplers of claim 30 wherein the core comprises a material selected from the group consisting of ferrous metals, iron, powdered irons, ferrites, ceramics, and combinations thereof.

32. The plurality of remotely powered inductive couplers of claim 30 wherein the core further comprises a laminated or tape wound core.

* * * * *